(12) United States Patent
Cole

(10) Patent No.: US 11,940,758 B2
(45) Date of Patent: Mar. 26, 2024

(54) LIGHT DETECTION AND RANGING

(71) Applicant: Envisics Ltd, Milton Keynes (GB)

(72) Inventor: Alexander Cole, Milton Keynes (GB)

(73) Assignee: Envisics Ltd, Milton Keynes (GB)

(*) Notice: Subject to any disclaimer, the term of this patent is extended or adjusted under 35 U.S.C. 154(b) by 419 days.

(21) Appl. No.: 17/320,516

(22) Filed: May 14, 2021

(65) Prior Publication Data
US 2021/0286319 A1 Sep. 16, 2021

Related U.S. Application Data

(63) Continuation-in-part of application No. 17/179,148, filed on Feb. 18, 2021.

(30) Foreign Application Priority Data

Feb. 19, 2020 (GB) .................................... 2002276

(51) Int. Cl.
*G03H 1/22* (2006.01)
*G01S 7/4865* (2020.01)
*G01S 17/88* (2006.01)

(52) U.S. Cl.
CPC ......... *G03H 1/2202* (2013.01); *G01S 7/4865* (2013.01); *G01S 17/88* (2013.01); *G03H 2001/2244* (2013.01)

(58) Field of Classification Search
CPC ......... G03H 1/2202; G03H 2001/2244; G03H 1/265; G03H 2001/0033;
(Continued)

(56) References Cited

U.S. PATENT DOCUMENTS 11,041,955 B2 * 6/2021 Schmalenberg ........ G01S 17/36
11,703,800 B2 * 7/2023 Marshel ............... G03H 1/0005
359/9
(Continued)

FOREIGN PATENT DOCUMENTS

CN 107906466 A * 4/2018 ............... B60Q 1/06
GB 2597828 A * 2/2022 ........... G03H 1/0005
(Continued)

OTHER PUBLICATIONS

CN107906466A English Translation (Year: 2019).*
Combined Search and Examination Report dated Nov. 12, 2020 for Great Britain Application No. GB2002277.0, 11 pages.

*Primary Examiner* — Fernando Alcon
(74) *Attorney, Agent, or Firm* — McDonnell Boehnen Hulbert & Berghoff LLP

(57) ABSTRACT

A light detection and ranging, "LiDAR", system arranged to make time of flight measurements of a scene. The LiDAR system comprises a holographic projector comprising: a spatial light modulator arranged to display light modulation patterns, each light modulation pattern comprising a hologram and a grating function having a periodicity; a light source arranged to illuminate each displayed light modulation pattern in turn; and a projection lens arranged to receive spatially modulated light from the spatial light modulator and project a structured light pattern corresponding to each hologram onto a respective replay plane. The LiDAR system further comprises a system controller arranged to receive distance information related to the scene and output to the holographic projector a control signal corresponding to the distance information. The holographic projector is arranged to use the control signal to determine a parameter for projection of a subsequent structured light pattern.

22 Claims, 15 Drawing Sheets

(58) Field of Classification Search
CPC ... G03H 2001/0825; G03H 2001/2281; G03H 2001/2292; G03H 2222/15; G03H 2222/16; G03H 2222/33; G03H 2223/17; G03H 2226/11; G03H 1/0005; G03H 1/2294; G01S 7/4865; G01S 17/88; G01S 7/4814; G01S 7/4816; G01S 7/4817; G01S 17/10
See application file for complete search history.

(56) References Cited

U.S. PATENT DOCUMENTS

| | | | |
|---|---|---|---|
| 2005/0286101 A1* | 12/2005 | Garner | G03H 1/02 359/9 |
| 2018/0046138 A1* | 2/2018 | Christmas | B60Q 1/085 |
| 2018/0259904 A1* | 9/2018 | Georgiou | G02F 1/13725 |
| 2019/0041641 A1* | 2/2019 | Christmas | G02B 27/102 |
| 2019/0041797 A1* | 2/2019 | Christmas | G03H 1/16 |
| 2019/0301855 A1 | 10/2019 | Ikemoto | |
| 2019/0354069 A1* | 11/2019 | Christmas | G03H 1/2205 |
| 2022/0100147 A1* | 3/2022 | Chang | G03H 1/2205 |
| 2022/0121028 A1* | 4/2022 | Smeeton | G03H 1/02 |
| 2023/0266447 A1* | 8/2023 | Smeeton | G03H 1/0005 356/4.01 |

FOREIGN PATENT DOCUMENTS

| | | | |
|---|---|---|---|
| WO | WO-2008025664 A2 * | 3/2008 | G03H 1/02 |
| WO | WO 2019/224052 | 11/2019 | |
| WO | WO-2019224052 A1 * | 11/2019 | B60Q 1/0023 |

\* cited by examiner

LIGHT DETECTION AND RANGING

CROSS-REFERENCE TO RELATED APPLICATIONS

This application is a continuation-in-part of U.S. patent application Ser. No. 17/179,148, filed Feb. 18, 2021, which claims the benefit of priority of United Kingdom Patent Application no. 2002276.0, filed Feb. 19, 2020, each of which is hereby incorporated herein by reference in its entirety.

FIELD

The present disclosure relates to making observations of a scene. More specifically, the present disclosure relates to a light detection and ranging, "LiDAR", system arranged to make time of flight measurements of a scene and to a method of determining a parameter for projection of a structured light pattern by a holographic projector that is comprised within such a light detection and ranging, "LiDAR", system. Some embodiments relate to determining a parameter of a software grating and/or to determining an intensity of a light source, for implementation within a LiDAR system. Some embodiments relate to an automotive LiDAR system or to a LiDAR system comprised within a portable device.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device.

The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example. The holographic projector may be used for light detection and ranging (LIDAR). Light detection and ranging (LIDAR) systems may be used in a variety of applications including portable devices and vehicles.

A moving diffuser may be used to improve image quality in devices which use coherent light such as holographic projectors.

The present disclosure is concerned with improvements in light detection and ranging systems. In particular, such improvements may include more reliable and/or more accurate techniques for surveying an area of a scene, in order to detect features of interest, using light detection and ranging.

Such improvements may include the compensation for errors that would otherwise arise, due to the spatial separation between different optical components within a system, for example within a light detection and ranging (LiDAR) system. They may also include the determination of a suitable intensity for a light source within such a system.

SUMMARY

Aspects of the present disclosure are defined in the appended independent claims.

In general terms; a system and method are provided, the system comprising a light source such as a holographic projector and a corresponding light detector, wherein an operational parameter of the light source can be adjusted, for subsequent operation, based on information received from (or via) the detector. The information received from (or via) the detector can be distance information, regarding the distance between the detector (and/or the light source) and one or more objects or targets. The distance information can be determined, by the detector and/or by a controller or processor, based on the times of flight (TOF's) of one or more light pulses, from the light source to the detector, via the object or target. A feedback loop can be implemented so that distance information obtained as a result of a first light pulse (or a first period of irradiation by the light source) can inform the selection of one or more operational parameters for the light source (and/or for the detector) for a subsequent operation. Similarly, information about the operation of the light source—for example, the timing and/or duration of light pulses—may be provided to the detector, or to a controller associated therewith, in order to inform its subsequent operation and/or to assist with its calculations or determinations.

The system may be configured to enable the selection of an appropriate intensity of light for the light source, based on the actual distance between the light source and an object in its illumination path. For example, the light source may be a laser light source. The selection may comprise the selection of a maximum possible intensity of the light, based on an assumption that the object is a vulnerable object such as a human eye, and thus keeping within predefined safety limits for the distance at which it is located, away from the light source.

The system may be configured to compensate for a parallax error, that would otherwise arise as a result of the light source and detector being not entirely coincident with one another, and thus having different respective lines of sight of an object or target. The extent (i.e. the size, or amount) of the parallax error may depend on the nature (e.g., the magnitude and/or direction) of the separation between the light source and the detector. A parallax error can occur (if not compensated for) even when the light source and detector are (parallel to one another, and/or even when the light source and detector are located, but spatially separated, on a common plane (i.e., coplanar). The system may be configured to provide an appropriate magnitude of compensation for parallax error, dependent on the separation between the light source and the detector, and on the distance at which an object or target is being 'viewed' by the light source and detector. The amount of compensation provided may be dynamically updated, in accordance with changing parameters of the scene and/or of the system itself, or in accordance with any other suitable constraints or requirements.

The system may be configured to achieve alignment of a structured light pattern that is formed by the holographic projector on a holographic replay plane, within the field of view of the detector. The system may be configured to dynamically correct for parallax, to ensure that the structured light pattern lies within (for example, entirely within) the field of view of the detector, regardless of the distance of the object under observation, from the detector, and regardless of whether, when or at what rate that distance may vary. A look up table or other reference source may be used, to ascertain the correction needed, for a particular set up, at a given time.

According to an aspect; a light detection and ranging, "LiDAR", system arranged to make time of flight measurements of a scene, is provided. The LiDAR system comprises a holographic projector comprising: a spatial light modulator arranged to display light modulation patterns, each light modulation pattern comprising a hologram and a grating function having a periodicity; a light source arranged to illuminate each displayed light modulation pattern in turn; and a projection lens arranged to receive spatially modulated light from the spatial light modulator and project a structured light pattern corresponding to each hologram onto a respective replay plane. There is a spatial separation between the spatial light modulator and the array of detection elements, such that they have two different respective lines of sight of a target, within the scene. The position of the structured light pattern on the replay plane is determined by the periodicity of the corresponding grating function. The LiDAR system further comprises a detector comprising an array of detection elements and an imaging lens arranged such that each detection element receives light from a respective sub-area of the holographic replay plane, wherein the sub-areas collectively define a field of view of the detector on the replay plane. The LiDAR system further comprises a system controller arranged to receive distance information related to the scene and output to the holographic projector a control signal corresponding to the distance information. The holographic projector is arranged to use the control signal to determine a parameter for projection of a subsequent structured light pattern. The parameter is indicative of a subsequent grating function that should be selected, for combination with a hologram, to ensure that the resulting structured light pattern, corresponding to that subsequent grating function, will be located within the detector's field of view on the replay plane.

According to an aspect; a light detection and ranging, "LiDAR", system arranged to make time of flight measurements of a scene, is provided. The LiDAR system comprises a holographic projector comprising: a spatial light modulator arranged to display light modulation patterns, each light modulation pattern comprising a hologram and a grating function having a periodicity; a light source arranged to illuminate each displayed light modulation pattern in turn; and a projection lens arranged to receive spatially modulated light from the spatial light modulator and project a structured light pattern corresponding to each hologram onto a respective replay plane. The position of the structured light pattern on the replay plane is determined by the periodicity of the corresponding grating function. The LiDAR system further comprises a detector comprising an array of detection elements and an imaging lens arranged such that each detection element receives light from a respective sub-area of the holographic replay plane, wherein the sub-areas collectively define a field of view of the detector on the replay plane. The LiDAR system further comprises a system controller arranged to receive distance information related to the scene and output to the holographic projector a control signal corresponding to the distance information. The holographic projector is arranged to use the control signal to determine a parameter for projection of a subsequent structured light pattern.

The field of view of the detector may be continuous. That is; the individual fields of view of the light detecting elements comprised within the detector may form a continuous area. That is; there may be no gaps between adjacent individual fields of view (IFOV's) of the respective light detecting elements.

The light source may be a laser light source. The light may be, for example, infra-red (IR) light, visible light or ultra-violet light.

The system controller may also be configured to provide an output to the detector. For example, it may provide an output indicating the timing and/or duration of light pulses, from the light source.

The grating function (also known as a phase-ramp function or a software grating) may be added to the hologram in order to provide a linear displacement of the structured light pattern (also known as a holographic reconstruction or a holographic replay field) on the (holographic) replay plane. The period of the grating function may determine the magnitude of the displacement. A required period of the grating, at a particular time, may be determined based on the received control signal that corresponds to distance information. The control signal may therefore inform the system of the required displacement of the holographic replay field in order to compensate for parallax. A repository of different grating functions may be provided, and a feedback system may be incorporated to select the required grating function from the repository of different grating functions, based on distance, at a given time.

The distance information may comprise the distance to an object or to a plane of interest. The object may be a nearest object. The distance information may comprise a distance per se or it may comprise other data from which distance can be calculated or inferred. For example, the distance information may comprise one or more times of flight (TOF's) of one or more light pulses, between two points. For example, it may comprise one or more TOF's of light travelling between the light source and the detector, via the spatial light modulator and the scene. For example, it may comprise one or more TOF's of light travelling between the spatial light modulator and the detector, via the scene. For example, it may comprise one or more arrival times of light at the detector.

The system may be arranged to 'observe or 'interrogate' a plane in space, within a scene. The distance of that plane, from the holographic projector and the detector, may be variable. The system may be arranged to continually probe a scene. It may be said that the system provides a temporal sequence of light detection and ranging 'frames' (or probe events). Each frame may comprise a display event (or 'an illumination event') and a detection event. Each frame has a corresponding range that defines the location of the plane in the scene that will be interrogated. The plane that will be interrogated may be substantially parallel to a plane of the source and detector. The range is a perpendicular distance between those two planes, in such an arrangement.

The controller may be arranged to determine the range of the next (or of a subsequent) light detection and ranging event (or frame) and to provide a signal to the holographic controller that determines the grating period of the next (or a subsequent) grating function that should be used. The structured light pattern may also be dynamically changeable in accordance with any desired illumination scheme.

The structured light pattern may comprise a plurality of discrete light features, wherein each discrete light feature is formed within a respective sub-area of the sub-areas that collectively define the field of view of the detector. The structured light pattern may have a non-uniform brightness across its area within the replay field. The discrete light features (also called "light spots" herein) may be separated by dark areas, and/or may be a pattern of light of graded brightness or intensity. The structured light may be characterised by its form, shape and/or pattern.

Each detection element comprised within the detector may be aligned with one light feature within the structured light pattern. There may be a one-to-one correlation between the detection elements and the discrete light features.

The light detection and ranging system may be used to form a temporal sequence of varying structured light patterns within a scene. The sequence may be derived from a predetermined sequence, or it may be a random sequence, or it may be a sequence arising from selections and/or determinations made by the controller, based on signals or other information received during, or as a result of, previous operation of the system.

The system may be configured such that a plurality of different points (on the same plane or within a depth of focus provided by the projection lens) in the scene may be interrogated at the same time. This may be achieved by illuminating the scene with structured light (e.g. a periodic array of discrete light spots) and using an array of detection elements combined with an imaging lens such that there is a one-to-one correlation between discrete light spots and individual detection elements. The person skilled in the art of optics will understand how the imaging lens may be chosen based on the desired detection resolution within the scene and so a detailed description of the design of the imaging lens is not required below. The dynamically variable grating function may be selected in order to maintain the one-to-one correlation between the detection elements and the discrete light features in accordance with the described scheme.

The system may be arranged to make a time-of-flight measurement in relation to each discrete light feature of a structured light pattern based on a detection signal from the corresponding detection element in order to form a plurality of time of flight measurements in relation to the structured light pattern. The time of flight may comprise a time that the light has taken to travel from the holographic projector, for example from the spatial light modulator, to the scene and back to the detector.

The light modulation pattern may comprise a lensing function having a focal length, wherein the distance from the spatial light modulator to the replay plane is determined by the focal length. The holographic projector, or a controller associated therewith, may be arranged to determine the focal length of the lensing function that is required to focus the structured light pattern on a replay plane of interest, based on the control signal. In some circumstances, a lensing function will not be needed in order to focus the structured light pattern correctly on a replay plane of interest.

The system controller may be arranged to determine a subsequent structured light pattern of a sequence of structured light patterns based on detection signals received from the array of detection elements. For example, the detection signals may give an indication of the distance of an object, or of a part of an object, or of the lack of an object, at a particular distance and the controller may use that information to select and control the structured light pattern that will be used next (or subsequently) to illuminate the scene.

The distance information may define the location of the replay plane in the scene for a subsequent structured light pattern. The distance information may, in other words, be the distance between the spatial light modulator and the replay plane, for that subsequent structured light pattern.

The spatial light modulator and the array of detection elements may be substantially parallel to one another and spatially separated. They may occupy a common plane, but be spatially separated on that plane.

The projection lens and the imaging lens may be substantially parallel to each other. They may occupy a common plane.

The projection lens and imaging lens may be substantially parallel to the spatial light modulator and array of detection elements. The distance between the spatial light modulator and the replay plane (which may be referred to as the 'range' of the system) may be a substantially perpendicular distance.

The distance information may define a plane in the scene. The scene may comprise, or be comprised within, a detected object.

The distance information may indicate the proximity of a nearest object in the scene, or of an object of interest or of an object displaying one or more particular characteristics.

The holographic projector may be arranged to determine the periodicity of a subsequent grating function of the sequence of light modulation patterns, based on the control signal, in order to ensure that the subsequent structured light pattern, corresponding to that subsequent grating function, is located within the field of view of the detector. For example, the structured light pattern may be entirely formed within the field of view of the detector, as a result of the presence of the grating function. As a result, a one-to-one correspondence between light features within the structured light pattern and the detecting elements within the detector may be maintained. This enables the detections made by the detector to be more accurate and to be more informative, for the system controller. For example, it may enable a more accurate image or representation to be formed, of the scene, based on the detections made by the detector.

The determination of the periodicity of a subsequent grating function may be made based on a pre-defined relationship, for example a pre-defined relationship between a distance of an object away from a plane of the light source and detector, and the magnitude of the correction needed to compensate for the resulting parallax error. The pre-defined relationship may vary according to, for example, the extent and/or the direction of the spatial separation between the spatial light modulator and the detector, and/or on the respective sizes of the spatial light modulator and the detector, and/or on one or more other factors.

The determination of the periodicity of a subsequent grating function may be made during a learning phase, or as part of a trial and error phase, in which different gratings of different respective periodicities are tried, until a grating that provides suitable parallax error is identified, for a particular set up and range. The system may be configured to be self-learning, or self-correcting, wherein previous selections of grating periodicity may be stored and/or may be referred to, in order to guide the selection of an appropriate grating periodicity during subsequent operation of the system. A grating periodicity may be deemed to be suitable if it provides parallax correction of a predetermined extent, or to within a predetermined margin of error.

The system may be arranged to determine an intensity of the light of the light source based on the control signal. For example, it may be arranged to determine a distance for a nearest object in the scene and to determine an intensity of the light that would be safe, in case that nearest object comprised a vulnerable object such as a human eye. The determination may make use of predefined levels or limits for eye-safe operation of a light source, such as a laser. Those predefined levels or limits may be determined by official or legally recognized safety standards, for a jurisdiction or jurisdictions.

According to an aspect, a method is provided of determining a parameter for projection of a structured light pattern by a holographic projector, said holographic projector being comprised within a light detection and ranging, "LiDAR", system arranged to make time of flight measurements of a scene. The LiDAR system further comprises a detector and a controller. The holographic projector comprises a spatial light modulator, arranged to display a light modulation pattern comprising a hologram and grating function having a periodicity, and a light source arranged to illuminate the displayed light modulation pattern and project a structured light pattern corresponding to the hologram on a replay plane. The detector has a field of view defined on the replay plane. There is a spatial separation between the spatial light modulator and the array of detection elements, such that they have two different respective lines of sight of a target, within the scene. The method comprises projecting light from the light source, via the spatial light modulator, towards the scene and detecting, by the detector, a reflection of the light from the scene. The method further comprises making a determination of distance information related to the scene, based on the detection made by the detector and selecting a parameter for a subsequent projection of a structured light pattern, by the holographic projector, based on the determined distance information. The parameter is indicative of a subsequent grating function that should be selected, for combination with a hologram, to ensure that the resulting structured light pattern, corresponding to that subsequent grating function, will be located within the detector's field of view on the replay plane.

According to an aspect, a method is provided of determining a parameter for projection of a structured light pattern by a holographic projector, said holographic projector being comprised within a light detection and ranging, "LiDAR", system arranged to make time of flight measurements of a scene. The LiDAR system further comprises a detector and a controller. The holographic projector comprises a spatial light modulator, arranged to display a light modulation pattern comprising a hologram and grating function having a periodicity, and a light source arranged to illuminate the displayed light modulation pattern and project a structured light pattern corresponding to the hologram on a replay plane. The detector has a field of view defined on the replay plane. The method comprises projecting light from the light source, via the spatial light modulator, towards the scene and detecting, by the detector, a reflection of the light from the scene. The method further comprises making a determination of distance information related to the scene, based on the detection made by the detector and selecting a parameter for a subsequent projection of a structured light pattern, by the holographic projector, based on the determined distance information.

The method may be a computer-implemented method.

The step of selecting a parameter for subsequent projection of a structured light pattern may comprise determining the periodicity of a subsequent grating function such that the resulting structured light pattern, corresponding to that subsequent grating function, will be located within the field of view of the detector. For example, there structured light pattern may be located entirely within the field of view of the detector, on the replay plane.

The step of selecting a parameter for subsequent projection of a structured light pattern may comprise determining a distance by which the structured light pattern should be moved, away from a reference point, on the holographic replay plane and determining the periodicity of the grating function that would effect that movement.

The distance information may define a plane in the scene.

The distance information may indicate the proximity of a nearest object in the scene.

The step of selecting a parameter for subsequent projection of a structured light pattern may comprise selecting an intensity of the light of the light source.

According to an aspect, a method is provided of controlling a light detection and ranging, "LiDAR", system arranged to make time of flight measurements of a scene, the LiDAR system comprising a holographic projector and a detector. The holographic projector comprises a spatial light modulator, arranged to display a light modulation pattern comprising a hologram and grating function having a periodicity, and a light source arranged to illuminate the displayed light modulation pattern and project a structured light pattern corresponding to the hologram on a replay plane. The detector has a field of view defined on the replay plane. The method comprises providing a control instruction to the holographic projector to project light from the light source, via the spatial light modulator, towards the scene and receiving a detection signal, from the detector, indicating a reflection of the light from the scene. The method further comprises making a determination of distance information related to the scene, based on the detection signal received from the detector and selecting a parameter for a subsequent operation of the holographic projector, based on the determined distance information. The method further comprises providing a control instruction to the holographic projector to perform said subsequent operation.

The method may be a computer-implemented method.

A computer program may be provided, comprising instructions which, when executed by data processing apparatus, causes the apparatus to perform a method according to any of the aspects or embodiments disclosed herein. A computer readable medium may be provided, storing such a computer program.

According to an aspect; a system is provided comprising a holographic projector and a detector. The holographic projector is arranged to display a light modulation pattern and to illuminate the displayed light modulation pattern, in order to form a reconstructed light pattern on a plane. The holographic projector further includes a periodic structure, wherein said periodic structure is arranged to be illuminated with the light modulation pattern and to cause the resultant reconstructed light pattern to be translated, relative to a reference position, on the plane. The detector is arranged to have a field of view of the detector on the plane, for detecting the reconstructed light pattern. The system further comprises a system controller arranged to receive a detection signal from the detector and to provide a control signal to the holographic projector, based on the received detection signal. The holographic projector is arranged to use the control signal to determine a parameter for a subsequent operation.

The periodic structure may comprise a grating or software grating or grating function or phase-ramp function. The period of the periodic structure may determine or contribute to the magnitude of the resultant translation of the reconstructed light pattern.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments or aspects may be partially or overall coupled to or combined with each other, and may be variously inter-operated with each other. Some embodiments or aspects may be carried out independently from each other, or may be carried out together in co-dependent relationship.

Optical Configuration

Figure 1:
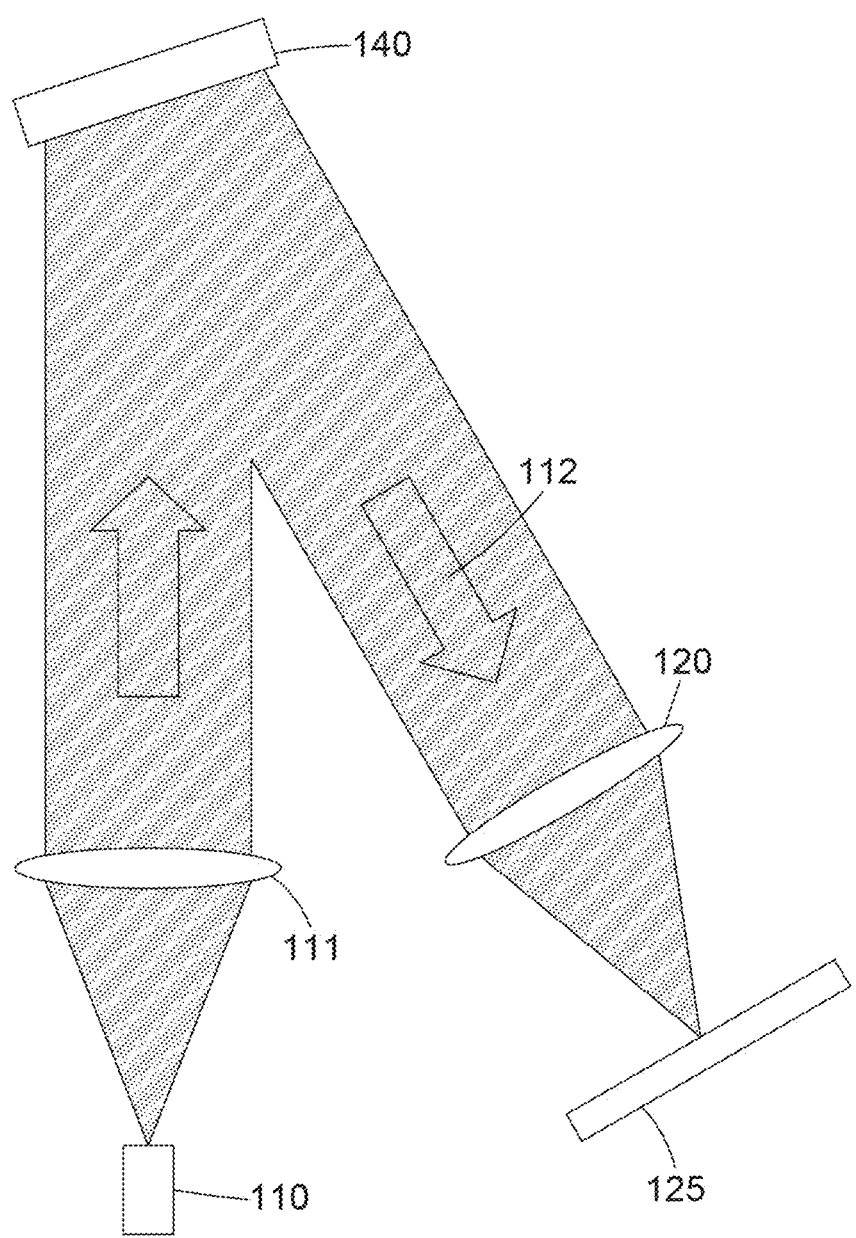
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
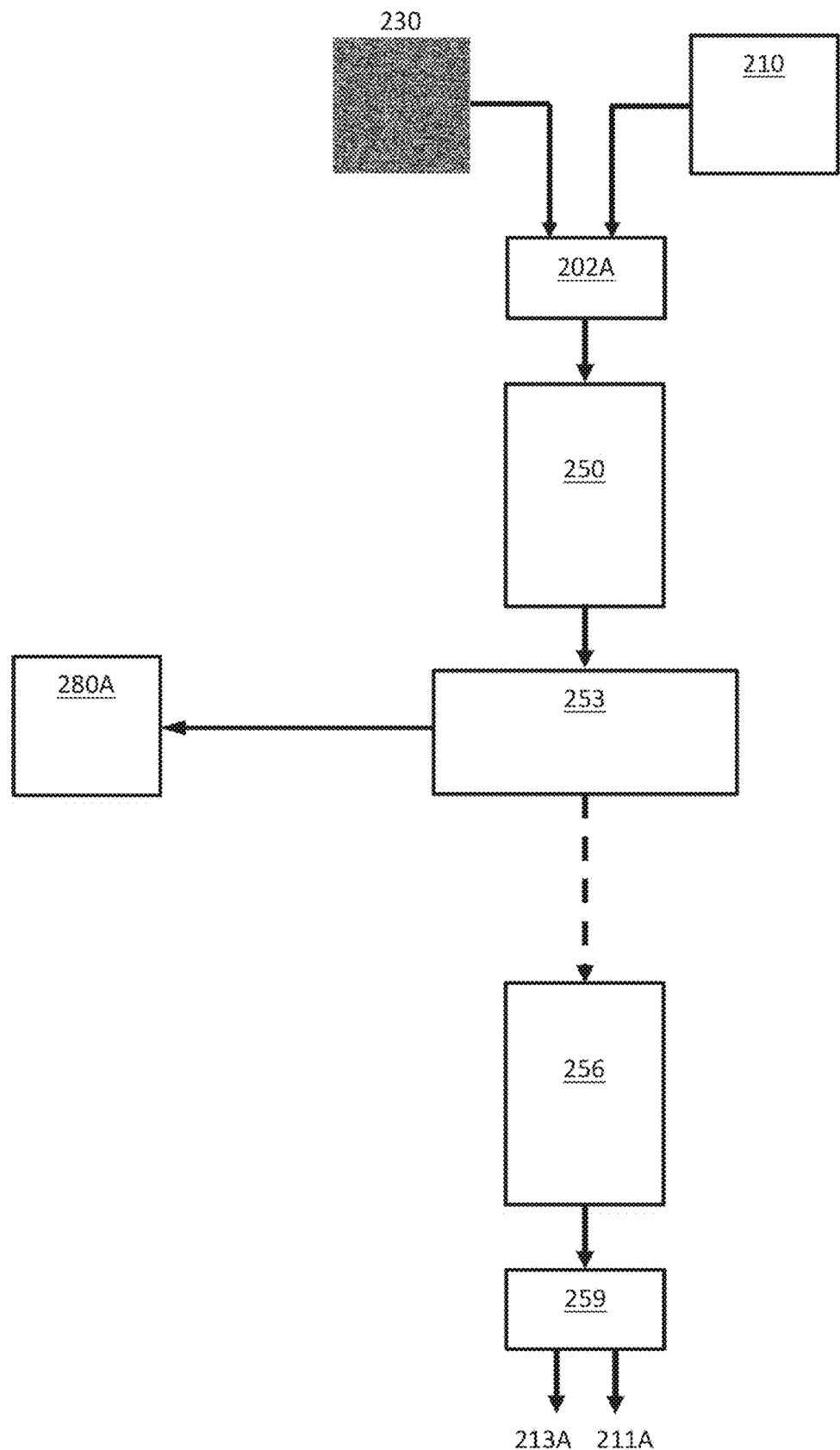
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
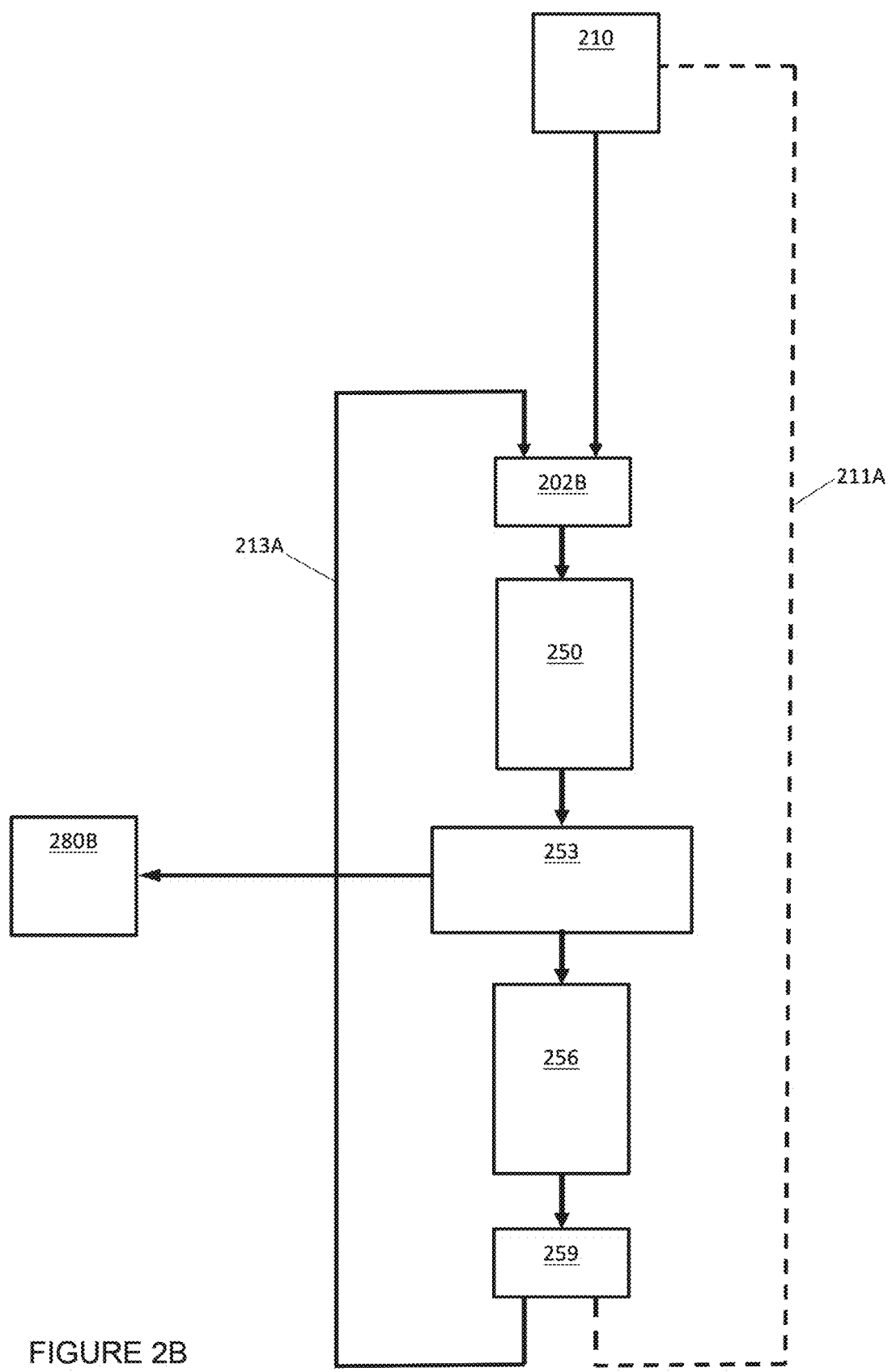
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
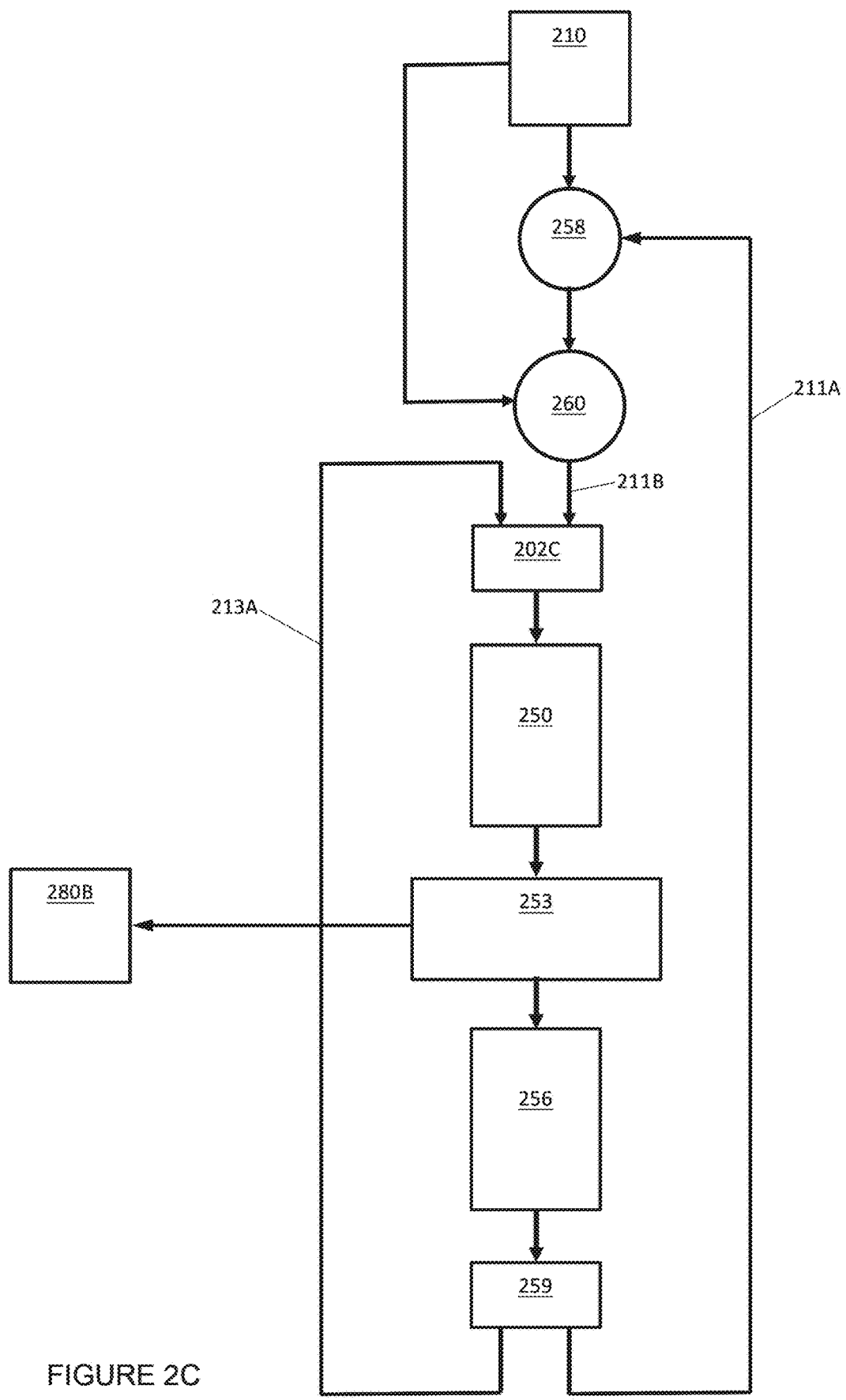
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x, y] = F'\{\exp(i\psi_n[u, v])\}$$

$$\psi_n[u, v] = \angle F\{\eta \cdot \exp(i \angle R_n[x, y])\}$$

$$\eta = T[x, y] - \alpha(|R_n[x, y]| - T[x, y])$$

where:
F' is the inverse Fourier transform;
F is the forward Fourier transform;
R[x, y] is the complex data set output by the third processing block 256;

T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
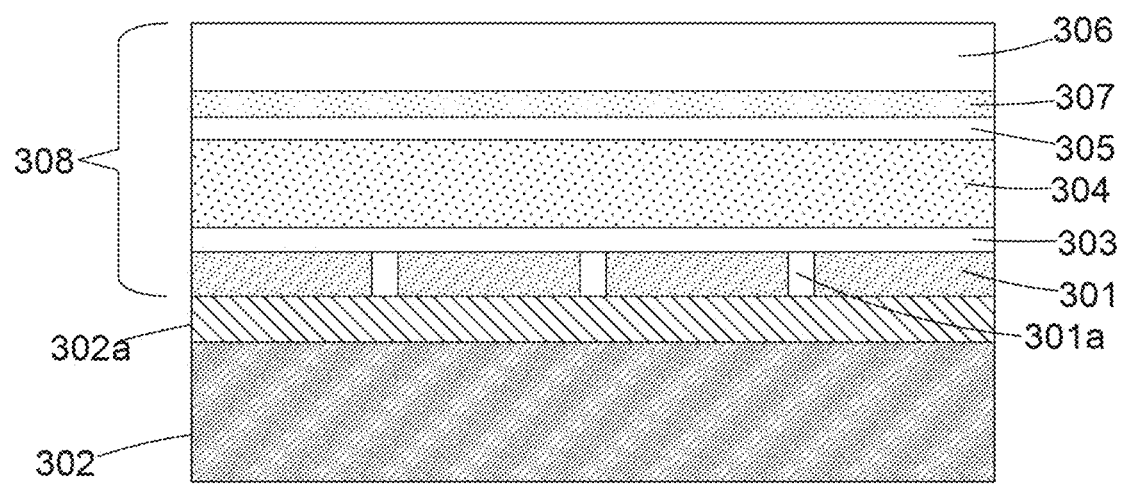
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Light Detection and Ranging ('LIDAR' or LiDAR') Systems

It has previously been disclosed that holographic components and techniques, such as those described herein, may be used to form the basis of a Light Detection and Ranging (LIDAR) system. The skilled person will be aware that, in general terms, LIDAR describes arrangements and methods in which the distance to a target may be measured by illuminating the target with laser light and measuring a parameter associated the light that is reflected from the target, using a sensor or detector. For example, the return times of the reflected light can be measured and may be used to form representations, such as three-dimensional (3D) representations, of the scene or a target within the scene.

WO2019/224052 discloses a holographic projector used to illuminate a target, or scene, or plane, using so-called 'structured light', in order to observe or interrogate that target (or scene or plane) as part of a LIDAR system. For example, the structured light may be characterised by having a particular form and/or shape and/or pattern. The pattern of the structured light arises from the hologram that is displayed by a spatial light modulator and illuminated by a laser light source, within the holographic projector. A holographic projector may be arranged to illuminate a plurality of different holograms in sequence (i.e. one after the other), to dynamically change the structed light pattern that is formed on the target.

In accordance with further advancements disclosed herein, the accuracy of a holography-based LIDAR system may be improved. In particular, a potential measurement error that can arise, in previously known systems, as a result of a light source and the corresponding detector being physically separated from one another, for example along a common plane, (known as the 'parallax' error) may be accounted for in a compact, accurate and reliable manner.

In embodiments, a periodic structure such as a grating (also referred to herein as a software grating) is provided, in combination with a hologram, within a holographic projector. The grating is operable to translate the position of a holographic reconstruction (which may be referred to instead as a holographic replay field and/or as a structured light pattern) on a holographic replay plane. The purpose of the translation is to account for the parallax error, which would otherwise arise due to the holographic projector not being exactly coincident with a corresponding light detector, which is arranged to detect the light that is reflected from the holographic replay plane. Because of their different respective positions; the holographic projector and detector have different respective lines of sight, and thus would have different respective perceptions as regards the exact positioning of that target (or of a particular point within that target) on the holographic replay plane. The role of the grating is therefore to compensate for those different respective lines of sight and to translate the holographic reconstruction, on the holographic replay plane, in order to align it with the detector's field of view, for example entirely within the detector's field of view. In embodiments, the presence of the grating ensures that any pattern of discrete light areas within the structured light pattern correctly maintain a correspondence (such as a one-to-one correspondence) with individual light detecting elements within the light detector.

The present inventor has recognised that the magnitude of error due to parallax is a function of distance. Moreover, the present inventor has recognised that it is typical for a target object or scene to be non-planar and for a LIDAR system to dynamically explore a target at different respective depths. The magnitude of the correction for parallax error can thus, according to embodiments, be changed dynamically, to fit with the changing distance between an (instantaneous) plane or interest and the plane of the holographic projector and detector. This can be done as part of a feedback loop. Further details will be appreciated from the description of the figures, which follows herewith.

Figure 4:
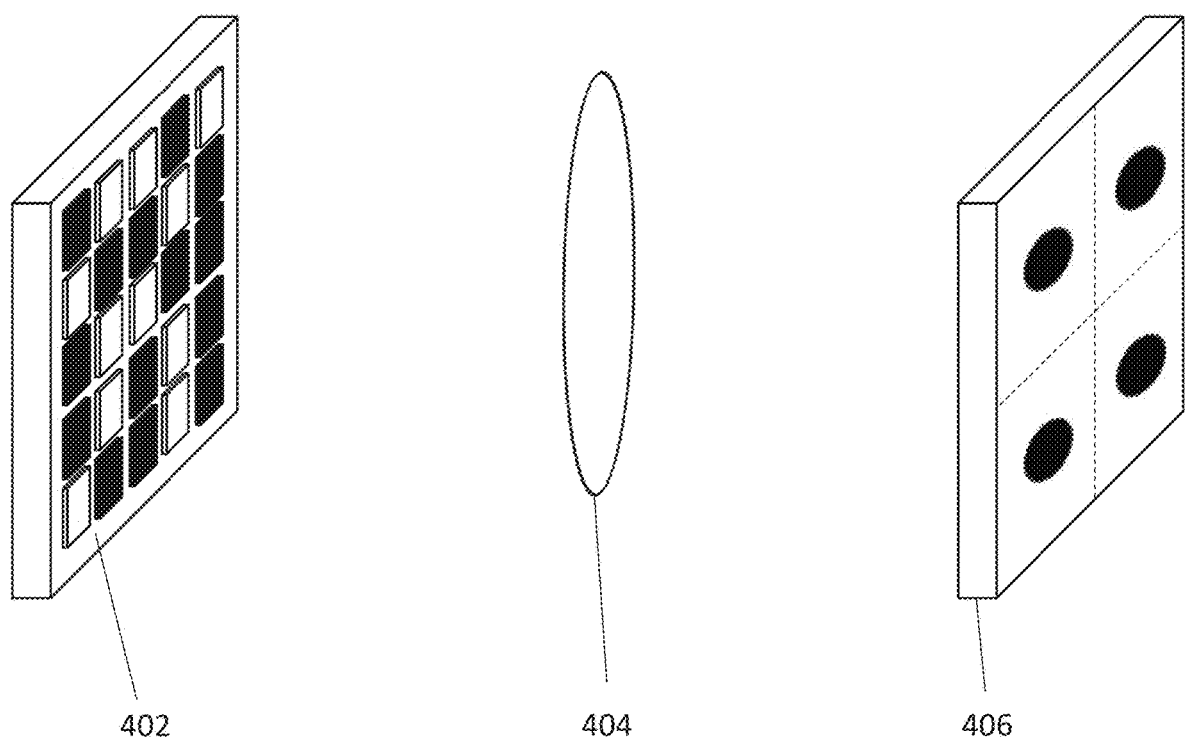
FIG. 4 is a schematic of a light source system, or holographic projector, that may be employed as part of a holographic Light Detection and Ranging (LIDAR) system.

FIG. 4 shows, by way of example only, a light source system or 'holographic projector' arranged to project a structured light pattern. The light source system comprises a spatial light modulator (SLM) 402 comprising an array of pixels that display a hologram. In FIG. 4, the SLM 402 is shown as having a 5×5 array of pixels (i.e. 25 pixels in total) but it will be appreciated that the number of pixels may vary from the particular example shown.

The SLM 402 is arranged to received light from a light source (not shown) such as a laser diode, in order to irradiate the hologram. The hologram in this example is a computer-generated hologram. The SLM 402 is arranged to receive, and to be encoded with, a computer-generated hologram from a display controller or other holographic controller (not shown). The SLM 402 may be arranged to receive a plurality of different computer-generated holograms, and to store, or otherwise have access to, those holograms for display at different respective times.

In FIG. 4 there is a projection lens 404, via which light travels from the SLM 402, towards a holographic replay field 406. The holographic replay field 406 is a two-dimensional area (within a so-called holographic replay plane) at which a holographic reconstruction of the irradiated hologram is formed. The holographic replay field 406 may comprise, for example, a light receiving surface such as a screen or diffuser. The holographic replay field 406 may comprise, for example, a real-world target object or scene. In the system of FIG. 4, the holographic replay field 406 comprises a plurality of discrete light areas—in this example, there are four discrete light areas, but it will be appreciated that the number of discrete light areas may vary from the example shown. In some embodiments, the projection lens forms an image of the holographic reconstruction formed from the hologram. The holographic reconstruction may be formed downstream of SLM 402 such as in free space between the SLM 402 and projection lens 404. In some embodiments, the image of the holographic reconstruction formed by projection lens 402 may be a magnified image of the holographic reconstruction. That is, in these embodiments, the structured light pattern used to probe the scene is actually an image of the holographic reconstruction of the hologram. For simplicity, in the present disclosure, such an image of the holographic reconstruction is still referred to as a holographic reconstruction. In some other examples, the projection lens 404 contributes to the (optical) Fourier transform of the hologram displayed on the SLM 402.

Irradiation of the hologram in FIG. 4 results in a holographic reconstruction that, in this example, comprises four discrete light spots; one in each of the four discrete light areas of the holographic replay field 406. The light pattern of the holographic replay field 406, is considered to be so-called 'structured light' because it comprises a plurality of discrete light features or sub-footprints that provide light in a corresponding plurality of discrete areas (or sub-areas) of the holographic replay field 406. It will be appreciated that any pattern of discrete light features, such as light spots, separate by areas of darkness, may be formed and the brightness of each light feature or spot can be individually tuned, based on the selection and irradiation of an appropriate respective hologram at any given time.

The light source system of FIG. 4 may be comprised within, for example, a holographic LIDAR system, as will be appreciated further from the detailed description of other figures, herebelow. Therefore, although the holographic replay field 406 is shown in FIG. 4 as being 'blank' apart from the four discrete light spots, in practice the system may be arranged to direct structured light on to, and form the holographic reconstruction on, a real-world target or 'scene'. The structured light comprised within the holographic reconstruction may be used to interrogate the scene, for example to help form an accurate image (or series of images) of the scene.

The scene that the light source system (or holographic projector) is arranged to direct structured light onto may not be planar but may have a depth. The holographic projector may therefore be arranged to dynamically adjust its operating parameters in order to vary the precise location of the holographic replay field 406 and holographic replay plane, to explore different respective depths (which may be referred to as different 'planes of interest') within the scene. A lensing function may be added to the hologram 402, in order to maintain focus of the structured light pattern on the plane of interest, at any given time.

The distance between the SLM (and the hologram) of a holographic projector and the plane of interest may be referred to as the 'range'. The range may be measured along a (virtual) line that joins the centre of the SLM (and of the hologram) to the centre of the holographic reconstruction. This line may be referred to as a 'projection axis.' Therefore, it may be said that the holographic projector of FIG. 4 may be controlled (for example, using a lensing function or a plurality of lensing functions) so as to vary the range along its projection axis, to enable observation of multiple planes of interest, and thus multiple depths, within a target or scene. This is discussed further below, in relation to subsequent figures.

In the example shown in FIG. 4, there is not a one-to-one correlation between the pixels of the hologram and the light features (or discrete light areas) of the holographic replay field 406. Instead, all the hologram pixels contribute to all areas of the holographic replay field 406.

Figure 5:
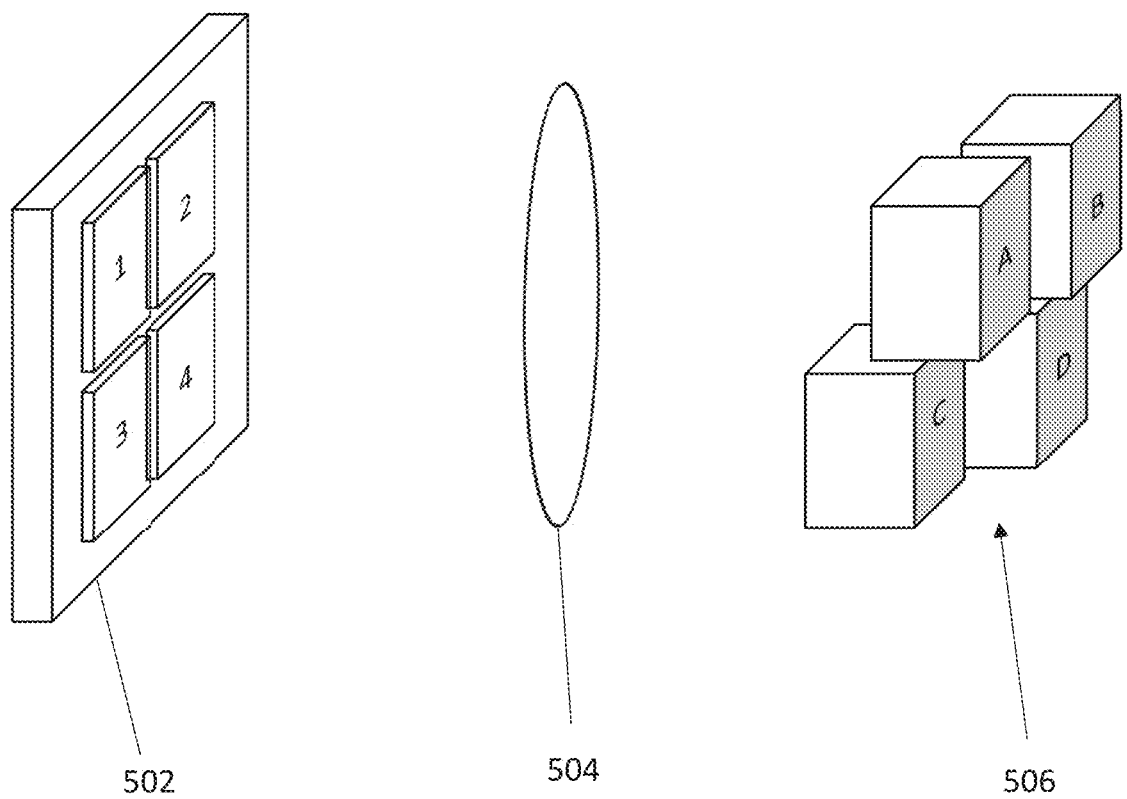
FIG. 5 is a schematic of a light detector system that may be employed as part of a holographic Light Detection and Ranging (LIDAR) system.

FIG. 5 shows a light detector system that comprises a light detector 502 and an imaging lens 504. The light detector 502 comprises a plurality of individual light detecting elements arranged in an array. There are four light detecting elements in the example shown in FIG. 5, wherein those light detecting elements are respectively numbered 1 to 4. The skilled person will appreciate that this number of light detecting elements is merely an example, and that other sizes of array and other numbers of light detecting elements are contemplated.

The light detector 502 may comprise, for example, a charge-coupled device (CCD) camera, comprising an array of CCD elements. Alternatively, the light detector 502 may be a single-photon avalanche diode (SPAD) array comprising an array of SPAD elements.

The light detector 502 is arranged to receive reflected light from a target or scene that is to be interrogated or observed. In the arrangement of FIG. 5, the observed scene 506 comprises objects labelled A, B, C and D, wherein not all of the labelled objects are located at the same distance from the light detector 502 as the respective others. In this example, object C is closest to the light detector 502, objects A and D are the next-nearest, at the same distance from the light detector 502 as one another, and object B is the furthest from the detector 502. The light from the observed scene 506 travels via the imaging lens 504, towards the light detector 502.

Each individual light detecting element (1, 2, 3, 4) of the light detector 502 in FIG. 5 is arranged to receive light from a single respective corresponding object (A, B, C, D) in the observed scene 506. Each light detecting element in the example of FIG. 5 is arranged only to receive light from its corresponding object and thus not to receive light from any of the 'other' objects within the observed scene 506. That is; the optics of the light detector system are arranged so that element 1 receives light from object A only, element 2 receives light from object B only, element 3 receives light from object C only and element 4 receives light from object D only. It may therefore be said that there is a one-to-one correlation between an individual light detecting element (1, 2, 3, 4) and its corresponding object (A, B, C, D) within the observed scene 506, although the light detecting elements and the objects may have different respective sizes.

The skilled person will understand that various types of optical system may be used to provide the one-to-one correlation between an individual light detecting element and its corresponding object within the observed scene 506. For example, in embodiments, the optical system may comprise a single lens (as in a camera), or a micro-lens array where each micro-lens is associated with an individual detector. But any suitable photodetector comprising an array of light sensing elements is possible and may be used for this purpose.

When light from the observed scene 506 is received by the detector 502, one or more parameters associated with that light can be measured or otherwise used to determine characteristics of the objects and of the scene 506, as will be discussed further below.

Figure 6:
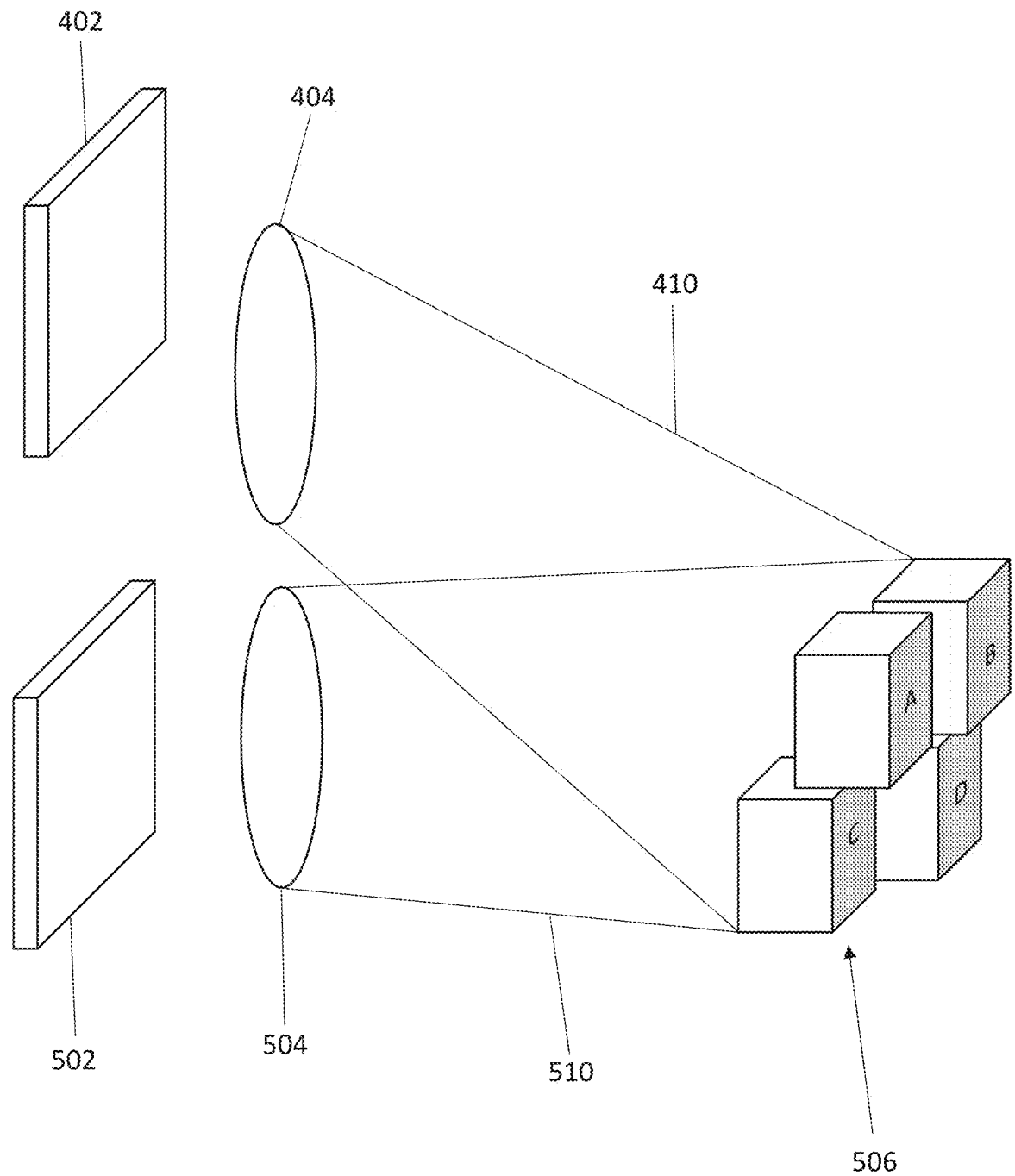
FIG. 6 is a schematic of a combined light source and detector system that may be employed as part of a holographic Light Detection and Ranging (LIDAR) system.

FIG. 6 shows a combined system, comprising a holographic projector (or light source) and a light detector, similar to the holographic projector and light detector shown respectively in FIGS. 4 and 5. The holographic projector comprises an SLM 402 and a projection lens 404. The holographic projector further comprises a Fourier transform lens (not shown) arranged to form an (intermediate) holographic reconstruction (also not shown) between the SLM 402 and the projection lens 404. As explained above, the projection lens 404 forms an image of the intermediate holographic reconstruction, wherein the image is the (holographic) structured light pattern projected onto the scene 506. For the avoidance of doubt, the image formed by projection lens 404 is also referred to herein as a holographic reconstruction. There is also a source of light, upstream of the SLM 402, arranged to transmit light towards the SLM 402, which is not shown in FIG. 6. The light may be infra-red (IR) light, visible light or ultra-violet light, dependent on application requirements.

The SLM 402 and projection lens 404 are decentred in FIG. 6. This is to enable the holographic light cone 410, travelling from the projection lens 404 towards an observed scene 506, to overlap with the reflected structed light cone 510, travelling from the scene 506 back towards the imaging lens 504 and the light detector 502.

In FIG. 6, the holographic light cone 410, which has exited the SLM 402 and travelled through the projection lens 404, is shown travelling towards the observed scene 506. The light is described as being 'holographic' because it comprises light that has been encoded by a hologram on the SLM 402. It forms a structured light pattern which is coincident with the observed scene 506. As described above in relation to FIG. 4; the SLM 402 may be configured to display a plurality of holograms, at different respective times. In some arrangements, the SLM 402 may be configured to display a sequence (or series, or plurality) of holograms, one after the other, so that multiple different structured light patterns are formed on the observed scene 506, in sequence.

As was the case in the arrangement of FIG. 5, discussed above, not all of the labelled objects in the observed scene 506 are located at the same distance from the light detector 502 as the respective others. Instead, object C is closest to the light detector 502, objects A and D are the next-nearest, at the same distance from the light detector 502 as one another, and object B is the furthest from the detector 502. The projection lens 404 has sufficient depth of focus such that the structured light pattern, which it forms on the observed scene 506, is "in-focus" on each of A, B, C and D at the same time, despite them not being co-planar with one another. The holographic light 410 is reflected by the elements A, B, C and D within the observed scene 506 and the resulting reflected structured light 510 travels towards the imaging lens 504 and on towards the light detector 502. As described in relation to FIG. 5, above, the light detector 502 in FIG. 6 comprises an array of light detecting elements, which have a one-to-one correlation with the objects (A, B, C, D) in the observed scene. It will be appreciated that other types of scene, with different respective numbers and arrangements of objects, and light detectors having a different array of light detecting elements, are also contemplated.

Although not explicitly illustrated in FIG. 6, the light detecting elements of the light detector 502 may be arranged to each output a light response signal, when reflected structured light is received from the observed scene 506. The structured light pattern may be ON-OFF gated, to provide switching of the light response signals. The light response signals may be transmitted to a processor or controller, for use in computation and/or for storage or display purposes. Thus, for example, a time of flight (TOF) value may be calculated for light travelling to and/or from each object (A, B, C, D) within the observed scene 506, based on the light response signal output by the corresponding light detecting element.

The arrangement of FIG. 6 may thus be provided as part of a light detection and ranging, "LIDAR", system, which can be arranged to scan or survey a scene. This is discussed further in relation to subsequent figures, herebelow.

Figure 7:
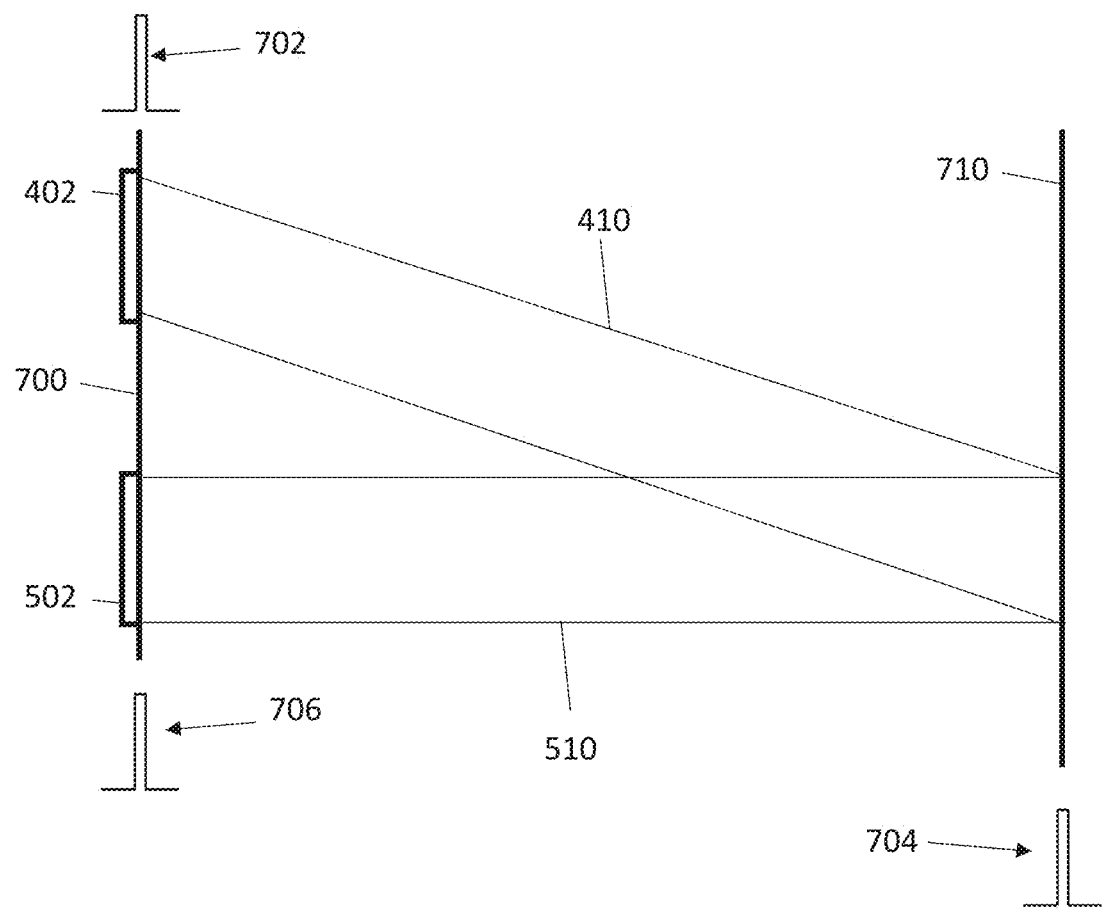
FIG. 7 is a schematic showing light travel in the system of FIG. 6.

FIG. 7 is a schematic depiction of the light pulses associated with operation of the arrangement of FIG. 6. In FIG. 7, the projection lens and image lens are not shown, for simplicity, however they may be provided in conjunction with the SLM 402 and the light detector 502, respectively, as per FIGS. 4 to 6, discussed above. The SLM 402 and is represented as being located, in FIG. 7, on a first 'source and detector' plane 700. The light detector 502 is represented as being coplanar with the SLM 402, on that source and detector plane 700. However, the SLM 402 is spatially separated from the light detector 502, on the source and detector plane 700.

FIG. 7 also shows an object plane 710, laterally spaced apart from the source & detector plane 700. The object plane 710 is a representation of a plane on which one or more objects, within a scene that is to be interrogated or observed, are located.

There is a light departure pulse 702 shown in FIG. 7, which is output from the holographic projector. The light travels towards the object plane 710 and is reflected, as shown by a light reflection pulse 704. That light then travels towards and is received by the detector 502, 504, as indicted by a light arrival pulse 706.

Figure 8:
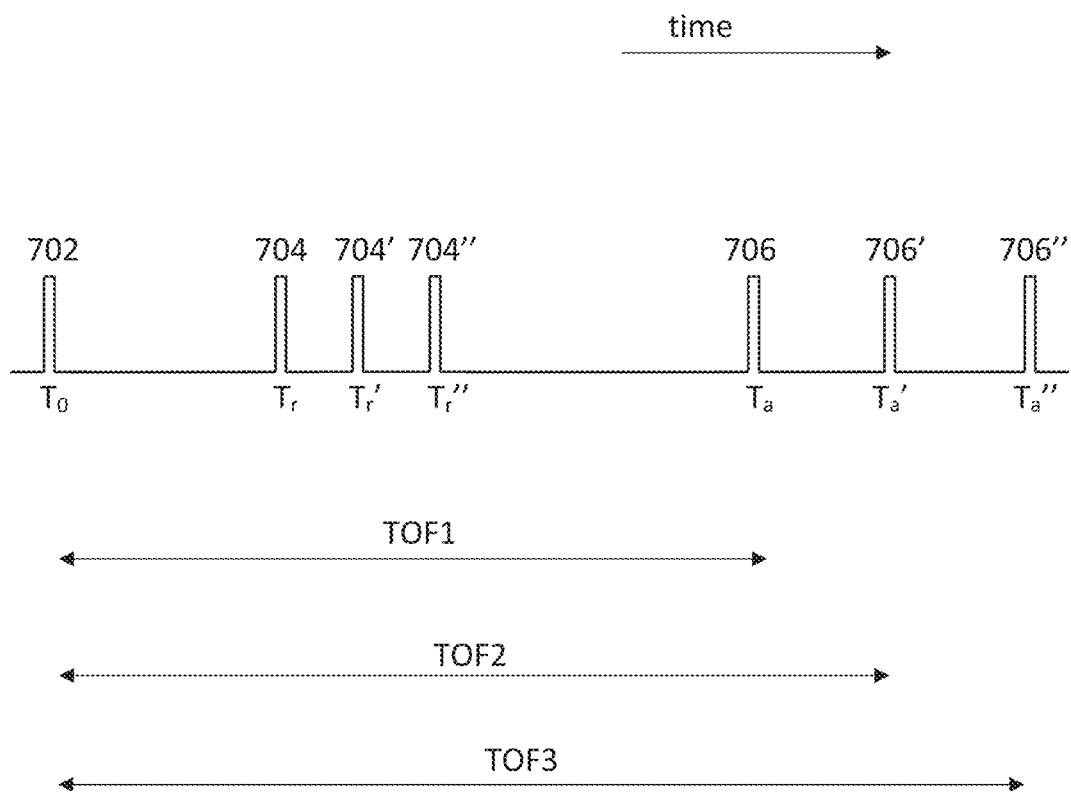
FIG. 8 is a schematic of respective times of flight (TOF's) of different light pulses in the system of FIG. 6.

The skilled reader will appreciate that, in most real-world applications, a scene that is to be observed or interrogated is unlikely to be entirely planar, but in fact will have multiple objects or facets therein, positioned at different respective depths. A projection lens may be used to provide a depth of focus, for the holographic construction (or an image thereof) to be focused on a range of depths within a scene, at once. In such an arrangement, there will be more than one reflection of an incoming light pulse from a scene, wherein different reflections occur at different respective times. FIG. 8 comprises a timeline that demonstrates this, using the observed scene 506 of FIG. 6 as an example.

As the skilled reader will be aware; the structured light pattern from the holographic projector may be ON-OFF gated to create a sequence of "display events". Optionally, each display event corresponds to a different hologram and therefore a different structured light pattern.

FIG. 8 shows a light pulse 702, from the holographic projector of FIG. 6, which corresponds to a structured light pattern of 4 light spots, projected towards the scene 506 at the same time. Each spot will be reflected from a different region of the scene 506 (corresponding to the objects A to D) towards four respective light detecting elements within the detector 502. Therefore, the single light pulse 702 will result in four reflection pulses, and will give rise to four respective light detection signals, from the detector 502.

Given the different respective depths of the objects in the scene 506; not all of the four light spots will be reflected at the same time as the respective others. That is; the light spot that is directed towards object C will arrive at, and thus be reflected by, object C before the light spots that are directed at objects A & D will arrive at, and thus be reflected by, objects A & D, and they, in turn, will arrive at, and thus be reflected by, objects A & D before the light spots that are directed at object B will arrive at, and thus be reflected by, object B. This is because the nearmost face of object C is closer to the holographic projector, along its projection axis, than the nearmost faces of A & D are and, in turn, the nearmost faces of A & D are closer to the holographic projector, along its projection axis, than the nearmost face of B is. It follows that the reflected light from these different faces (or pair of faces) at different respective distances from the holographic projector will also arrive at the detector at different respective times.

Referring again to FIG. 8; it can be seen that an initial light departure pulse 702 is issued from the holographic projector at a first time (To) There is then a first reflection pulse 704 at a time $T_r$, which represents the time at which the corresponding light spot was reflected from object C. Subsequent thereto, there is a second reflection time pulse 704', at a time $T_{r'}$, which represents the time at which the corresponding light spots were reflected from objects A and D, and a third reflection time pulse 704", at a time $T_{r''}$, which represents the time at which the corresponding light spot was reflected from object B. After a period, there is then a first arrival time pulse 706, at a time $T_a$, which represents the arrival of the reflected light from object C, at light detecting element 3 of the detector. Subsequent thereto, there is a second arrival time pulse 706' at a time $T_{a'}$, which represents the arrival of reflected light from objects A and D at, respectively, light detecting elements 1 and 4 of the detector, and a third arrival time pulse 706" at a time $T_{a''}$, which represents the arrival of reflected light from object B at light detecting element 2 of the detector.

FIG. 8 also shows first (TOF1), second (TOF2) and third (TOF3) times of flight (TOF), which represent the total travel time for the light that has travelled the three different respective distances—from the projector to object C and back to the detector again ($T_0$ to $T_a$); from the projector to objects A and D and back to the detector again ($T_0$ to $T_{a'}$); and from the projector to object B and back to the detector again ($T_0$ to $T_{a''}$). The detector, or a controller or processor associated therewith, can make use of the different arrival times from different respective objects within a scene, and/or of their different TOF's, to determine or check the distances of those objects from the detector, and in some cases to ascertain information on the form or topography of the scene.

Although the holographic projector 402, 404 and light detector 502, 504 in FIGS. 7 and 8 are coplanar, there is a spatial separation between them. In practice; in a LIDAR system (and in certain other applications) it is typical to have a holographic projector that is spatially separated from the detector, and which may not be co-planar with the detector. Even if the projector and the detector are coplanar with one another, their physical separation along that common plane can still lead to a so-called 'parallax error' between the two systems. As the skilled reader will know; a parallax error is a displacement or difference in the apparent position of an object or target, when it is viewed along two different lines of sight. Therefore, even when a projector and a detector occupy the same plane, if they are not entirely coincident with one another on that plane, they will 'view' a target or scene from different perspectives and, as a result, will perceive two different respective positions in space, for that target or scene. In a LIDAR system, for example, in which a holographic projector is configured to control the projected light, to strike specific locations in the physical world, this parallax error could result in the projector missing its target, or in the need to overfill a target, wherein the area of light that illuminates the scene is bigger than the scene and bigger than it would need to be if parallax error were compensated for.

Figure 9:
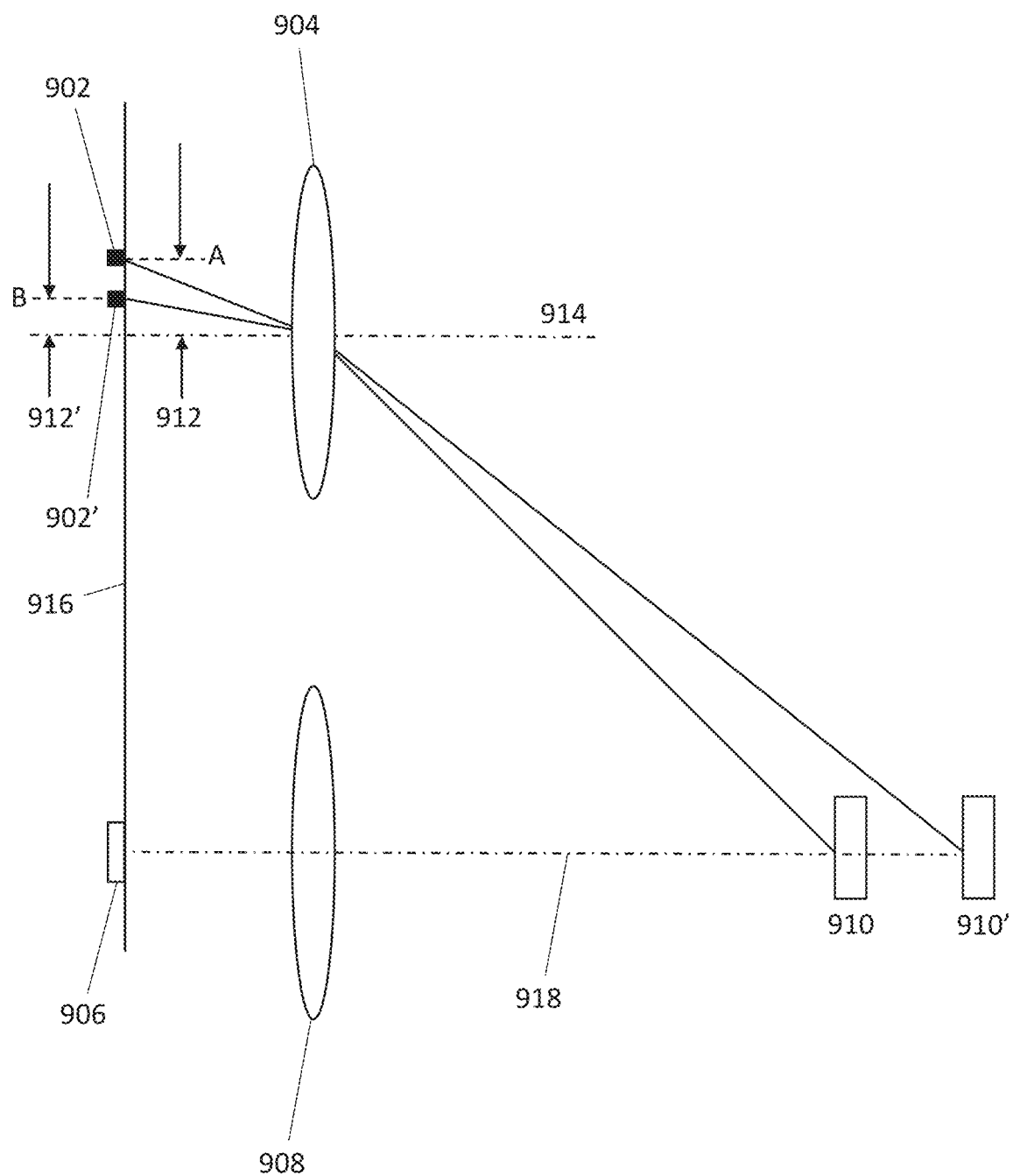
FIG. 9 is a schematic of a light detection and ranging (LIDAR) system, in accordance with embodiments.

FIG. 9 shows one possible approach to addressing the above-described parallax problem, which has been identified by the present inventor. The arrangement in FIG. 9 comprises an SLM, which is shown twice in first 902 and second 902' respectively different positions, as detailed further below. The SLM 902, 902' is encoded with, and configured to display, one or more holograms, which can be irradiated by incident light to produce a structured light pattern. There is also a projection lens 904, which has an optical axis 914 projecting laterally through its mid-point. The SLM 902, 902' and projection lens 904 are configured so that, in either position of the SLM 902, 902' the light that exits the SLM 902 902' travels through the projection lens 904, towards a scene.

The arrangement in FIG. 9 also comprises a light detector 906, comprising an array of light detecting elements, for example a SPAD array. The light detector 906 is situated on the same plane as the SLM 902, 902' (in either position) this plane may be referred to as a 'light source and detector plane' 916. As was the case in earlier-described arrangements; the detector 906 is spatially separated from the SLIM 902, 902' along the light source and detector plane 916. An imaging lens 908 is provided, arranged so that light travelling from the scene will travel via the imaging lens 908, towards the detector 906. The optical centre of the imaging lens 908 is aligned, along an axis, with the midpoint of the detector 906 and with the midpoint of a target, which is shown twice—in first 910 and second 910' respectively different positions, which correspond respectively to the locations at which the holographic construction would be formed, by the SLM, when the SLM is at its first 902 and second 902' positions.

The skilled reader will appreciate that, conventionally, the SLM of a holographic projector would be aligned with its projection lens, so that the midpoint of the SLM was located on the same optical axis that runs through the optical centre of the projection lens. However, it can be seen that, in each of the first 902 and 902' positions in FIG. 9, the SLM has been decentred from the optical axis 914 of the projection lens 908. This is because the present inventor has recognised that, by decentring of the midpoint of the SLM from that optical axis 914, a correction can be made for the parallax error that would otherwise have arisen, as a result of the SLM 902 902' and the detector 906 being in different respective positions along their common plane 906, and thus having different respective views of the target 910, 910'.

Parallax errors between two 'viewing' entities vary in their size (or extent, or magnitude) dependent on the distance between the two viewing entities—in this case, the SLM and the light detector and the object or target that is being 'viewed'. Parallax errors between two 'viewing' entities also vary in their size (or extent, or magnitude) dependent on the separation between those two viewing entities, for example based on how far apart they are from one another, on a common plane. In general terms, the parallax error is bigger for targets that are closer to the viewing entities than it is for targets that are further away from the viewing entities. As a result, a more significant correction is required, to account for a potential parallax error, for a relatively near target as compared to the correction that is required for a relatively distant target.

In FIG. 9 there is shown a first distance, 'A', which is the distance, along the source and detector plane 916, between the optical axis 914 and the midpoint of the SLM, when it is in its first position 902. In accordance with the recognitions made by the present inventor, the first position 902 is the position required for the SLM, in order to account for the parallax error for a first plane of interest, which corresponds to the first position 910 of the target in FIG. 9. Distance 'A' therefore denotes the distance by which the SLM must be decentred from the optical axis 914, in order to correct for parallax error in relation to the target when in its first position 910. By contrast, there is shown a second distance, 'B', which is the distance, along the source and detector plane 916, between the optical axis 914 and the midpoint of the SLM, when it is in the second position 902'. Also in accordance with the recognitions made by the present inventor the second position 902' is the position required for the SLM, in order to account for the parallax error on a second plane of interest, which corresponds to the second position 910' of the target. Distance B therefore denotes the distance by which the SLM must be decentred from the optical axis 914, in order to correct for parallax error in relation to the target when in its second position 910'.

The first plane of interest is closer, in the direction of the optical axis 914 (i.e. laterally, or left-to-right as show in FIG. 9) to the source and detector plane 906, than the second plane of interest is. Therefore, the size of the required correction for parallax error is greater for the first plane of interest than it is for the second plane of interest. It follows that the decentring distance A, which is required for moving the SLM in order to accurately make time of flight measurements on the first plane of interest, is larger than the decentring distance B, which is required for moving the SLM in order to accurately make time of flight measurements on the second plane of interest.

Although moving the SLM, as shown in FIG. 9, does enable an optical system to account and correct for parallax error, it will be appreciated that, in practice, it may not be preferred, or even possible, to move the SLM. This may particularly be the case for arrangements in which a target scene is to be continually (or frequently) interrogated at multiple depths, such that the depth location of the structured light pattern has to be dynamically changed. Such an arrangement would require the SLM to be moved regularly, possibly at high speeds, which may cause wear and tear and/or damage to the SLM. Moreover, in some applications in which available space is limited, it may be sub-optimal or even impossible to provide space for movement of the SLM.

The present inventor has made a recognition that it is possible to compensate and correct for a parallax error, between two 'viewing entities' such as a light source (or holographic projector) and a light detector, wherein a parallax error could arise if those two viewing entities have different respective lines of sight when viewing a target or object, without having to move any of the optics within either viewing entity. The present inventor has recognised that, in the case of a light source comprising a holographic projector having an SLM, configured to display and enable irradiation of a hologram, a periodic structure such as a grating function (also known as a phase-ramp function) can be added to the hologram in order to correct for parallax error. Moreover, the present inventor has recognised that the required parallax correction, and therefore the particular grating periodicity (or phase-ramp gradient) that is needed for a parallax correction will depend on the distance between the object (or plane) of interest and the plane (or planes, if they are non-coplanar) of the holographic projector and its detector. The present inventor has thus recognised that a received input regarding the distance between the target and the light source (and/or the detector) can be used to enable a controller to select and apply an appropriate grating function to a hologram, at a given time, in order to provide appropriate parallax correction.

A repository of different grating functions may be provided, and a feedback system may be employed in order to enable selection of an appropriate grating, based on distance to a target. As described above, in real-world applications a target scene or object may have depth, as opposed to being planar. The depth of a target scene or object may be greater than the depth of focus of the optics of the holographic projector, at a given time. Therefore, an application such as a LIDAR system may be configured to repeatedly probe a scene, by probing different depths within the scene, at different respective times. This may be done dynamically, possibly continually, at relatively high speeds. Each probe event for such a system may be referred to as a 'frame', wherein each frame comprises an illumination event and a detection event. Each frame has a range (or distance) that defines the location of the plane in the scene that will be interrogated, or observed, as compared to the location of the holographic projector and detector. The present inventor has recognised that the selection of an appropriate grating may be changed dynamically, in correspondence with the rate at which different respective depths are probed. A lensing function may also be provided, with the hologram and software grating, to enable the holographic reconstruction to be correctly focused at various different depths.

As mentioned above, the size of a parallax error may also depend on the details of the separation between the two viewing entities—such as the distance between a light source and the corresponding detector. The present inventor has therefore recognised that the correction for parallax error, and the appropriate grating function that would provide that correction, can differ if there is a change in the size and/or direction of the separation between the two viewing entities. In many systems, the separation between the two viewing entities is likely to be fixed, or at least not to vary regularly. However, the present inventor has recognised that the separation between two viewing entities—and any changes that occur, in relation to that separation—can be determined and accounted for, in the determination of an appropriate correction for the parallax error that would otherwise occur, when those two viewing entities are employed to observe an object or target.

Figure 10A:
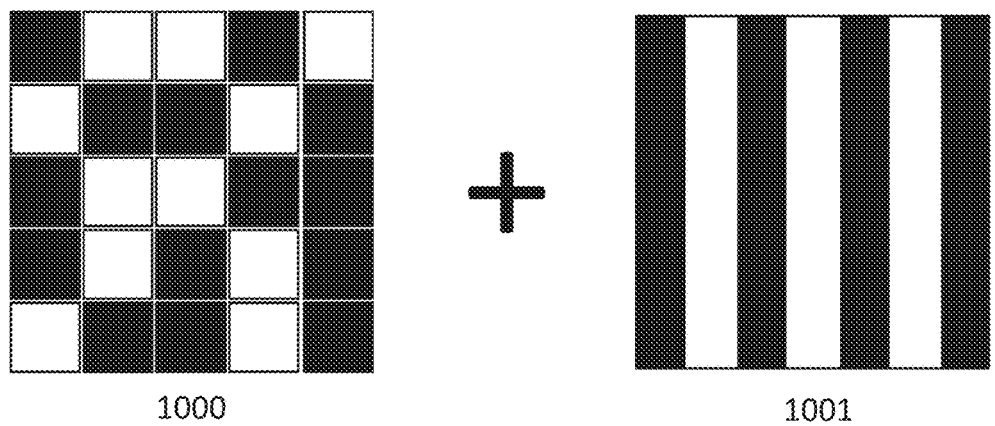
FIG. 10A is a schematic of a hologram and software grating in accordance with embodiments.
Figure 10B:
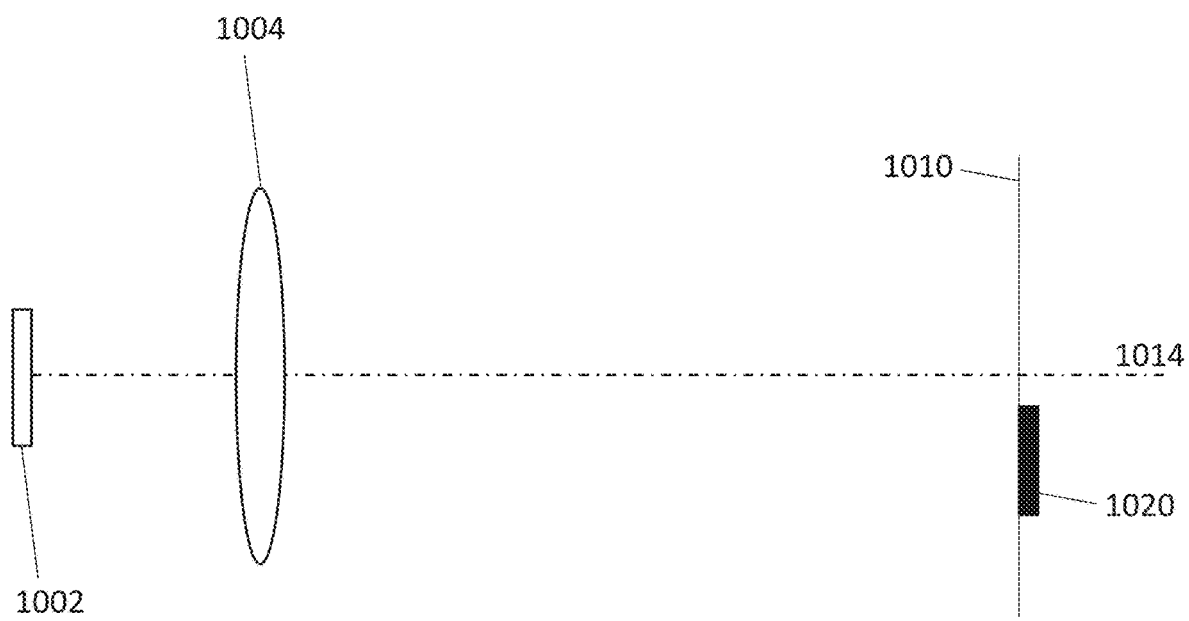
FIG. 10B is a schematic of a holographic projector arrangement, comprising the hologram and software grating of FIG. 10A.

FIG. 10A shows a first example of a hologram 1000 and a first software grating 1001 that can be supplied to work in conjunction with the hologram 1000, to compensate for parallax error in a combined light source and detector system, for example a LIDAR system. FIG. 10B shows a light source system, or holographic projector, comprising an SLM 1002 and projection lens, wherein the hologram 1000 and the first software grating 1001 can be displayed by the SLM 1002. The system of FIG. 10B further comprises a holographic replay plane 1010, on which a holographic reconstruction (or image of an intermediate holographic reconstruction) will be formed by the system, when the hologram 1000 and first software grating 1001 are provided on the SLM 1002 and irradiated by a suitable light source (not shown). As can be seen in FIG. 10B, the SLM 1002 and projection lens 1004 are both centred along a common optical axis 1014, which is substantially perpendicular to the face of the holographic replay plane 1010. By contrast; the holographic reconstruction is not centred along that optical axis 1014, but instead is formed at a first 'corrected' holographic replay field position 1020, which is decentred from the optical axis 1014, on the holographic relay plane 1010. This decentring of the holographic reconstruction has arisen as a result of the presence of the first software grating 1001, being in combination with the hologram 1001.

Figure 11A:
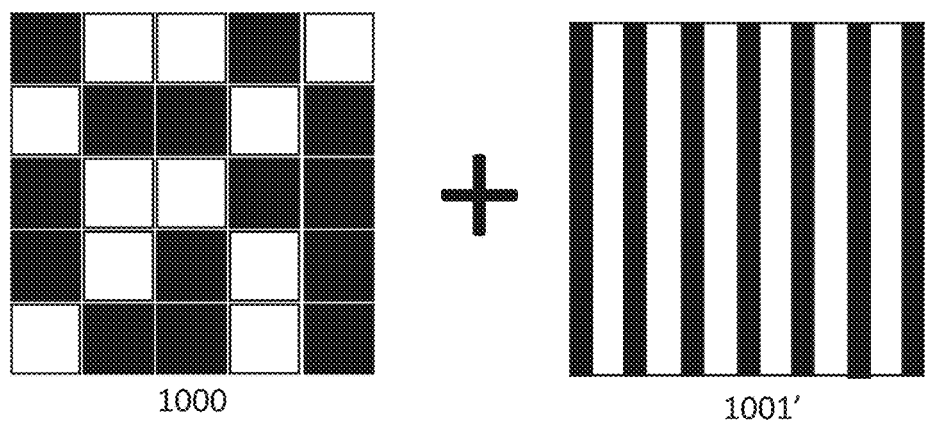
FIG. 11A is a schematic of a hologram and software grating in accordance with embodiments.
Figure 11B:
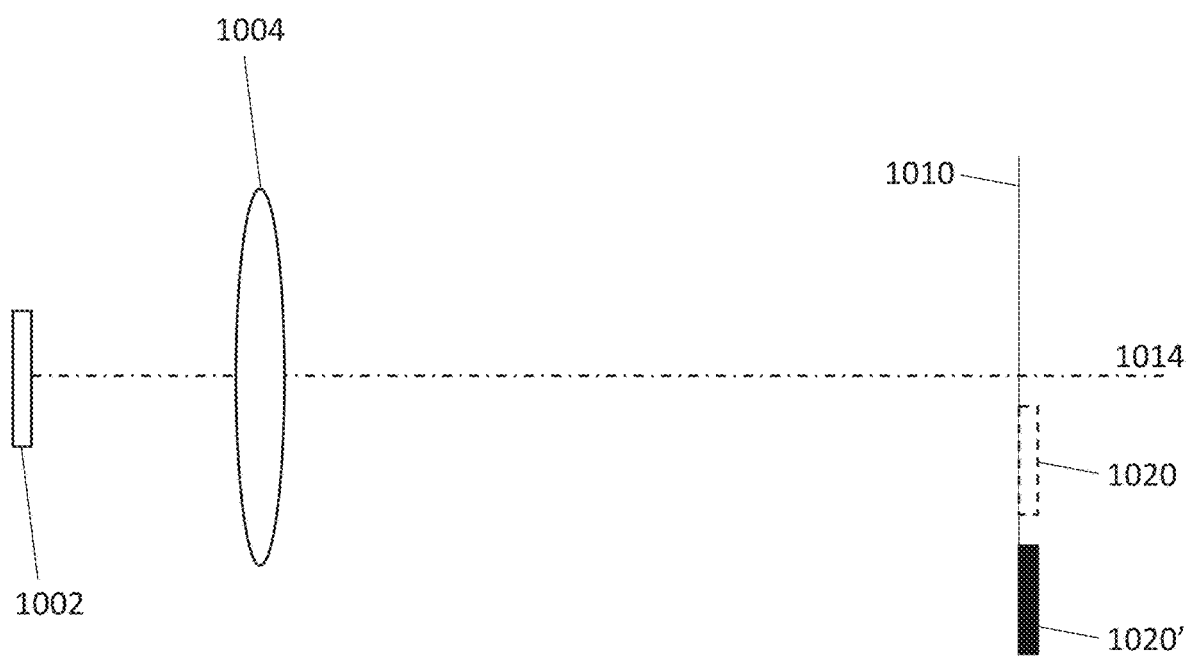
FIG. 11B is a schematic of a holographic projector arrangement, comprising the hologram and software grating of FIG. 11A.

Referring now to FIG. 11A; the same hologram 1000 can be seen, but this time in conjunction with a second, different software grating 1001'. It can be seen that the periodicity of the second software grating 1001' differs from that of the first software grating 1001. FIG. 11B shows the same optical system as is shown in FIG. 10B, but this time with the holographic reconstruction at a second, different, 'corrected' holographic replay field position 1020' on the holographic replay plane 1010, due to the different positioning correction that the second software grating 1001' provides, as compared to the first software grating 1001 of FIG. 10A. The outline of the first 'corrected' holographic replay field position 1020 is also shown, by a dashed line, in FIG. 11B, for comparison purposes.

Thus, it will be appreciated that the two software gratings 1001, 1001' of FIGS. 10A and 11A respectively could be used to correct two respectively different parallax errors, if the holographic projector was used in conjunction with another entity, such as a light detector in a LIDAR system. That is; the two software gratings 1001, 1001' could be used to correct two different parallax errors, which would otherwise arise when the holographic projector was forming a holographic reconstruction for observation or interrogation of a scene, target, or object, at two different respective distances (or depths), away from the projector and detector.

It will be appreciated that the particular hologram 1000 and gratings 1001, 1001' shown in these figures are provided by way of example only. Other types, sizes, shapes and configurations of hologram and software grating are also contemplated.

Figure 12:
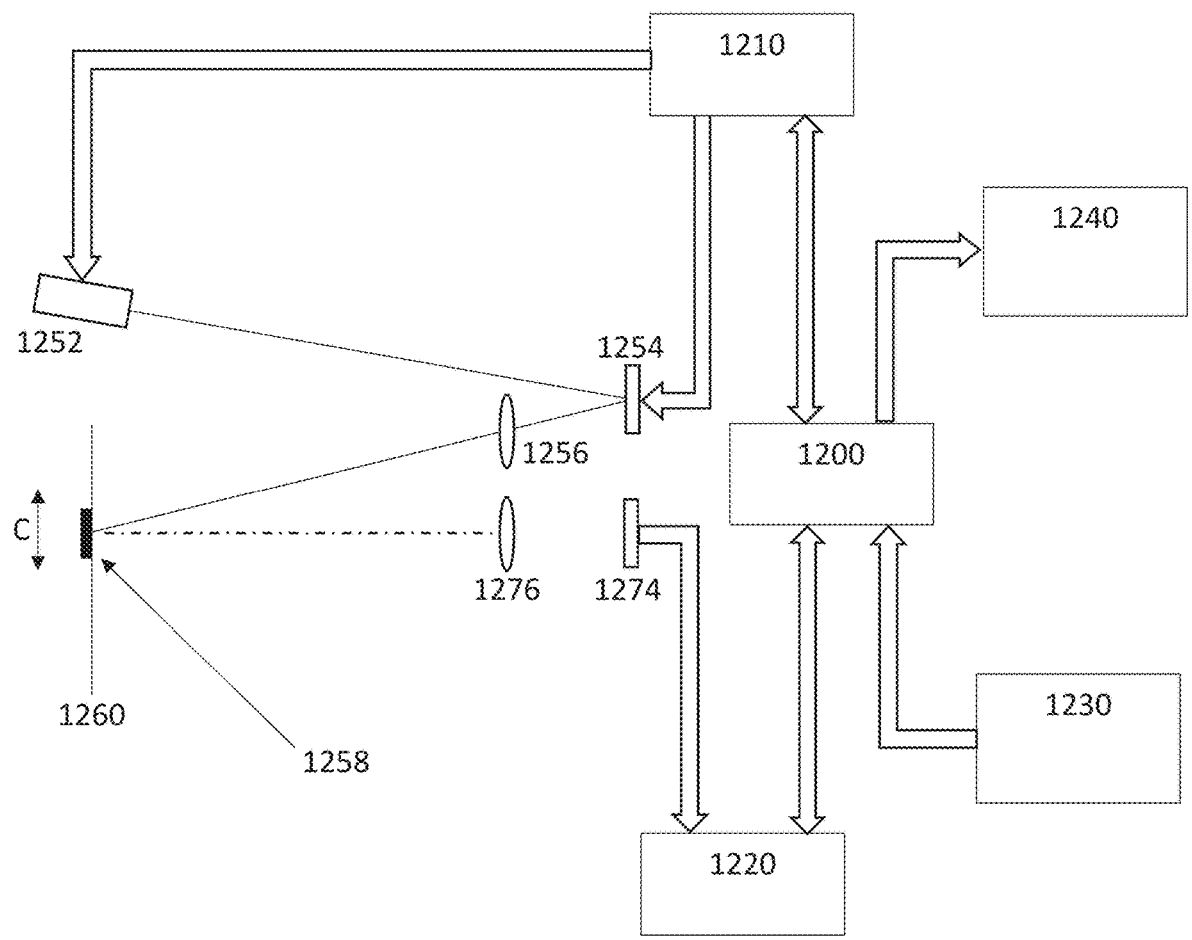
FIG. 12 is a schematic of a Light Detection and Ranging (LIDAR) system, in accordance with embodiments.

FIG. 12 comprises a system diagram for an example of a LIDAR system that embodies the recognitions made by the present inventor. The LIDAR system may be provided, for example, in a vehicle, as part of a navigation system, or in a portable device or in a range of other applications.

The system comprises an SLM 1254 and an array detector 1274, which are provided coplanar with one another but spatially separated from one another, on their common plane. The SLM 1254 is provided in conjunction with a projection lens 1256 and the detector 1274 is provided in conjunction with an imaging lens 1276. There is a light source 1252 which in this example comprises a laser diode. The laser diode 1252 is arranged to direct light towards the SLM 1254, which reflects structured light towards a holographic replay plane 1260, via the projection lens 1256. The laser diode 1252 is positioned and oriented so that the incoming light arrives at an acute angle to the central lateral axis (not shown) of the SLM 1254. As a result, the structured light is also reflected away from the SLM 1254, via the projection lens 1256, at an acute angle, towards the holographic replay plane 1260.

The system is configured to compensate for the parallax error that would otherwise arise, due to the spatial separation between the SLM 1254 and the detector 1274, by controlling the input(s) to the SLM 1254. The system is configured to know the size and direction of that spatial separation. In some cases, the system may be configured to monitor for any changes to that spatial separation, and to account for any such changes in the calculation of an appropriate compensation for parallax error, at a given time. The SLM 1254 is encoded with (or arranged to be encoded with) a hologram and a software grating, which can be irradiated by the laser diode 1252 in order to provide the reflected structured light. As will be appreciated further from the discussion of the system's control, below, the SLM 1254 is configured for display of one of a selection of holograms, in conjunction with one of a selection of software gratings, at any given time during operation. A particular software grating can be selected in order to compensate for a detected or expected parallax error. That is; dependent on the distance of the holographic replay plane 1260 away from the plane of the SLM 1254 and detector 1274, and therefore dependent on the extent of the parallax error to be compensated for, an appropriate software grating can be chosen by the system. An appropriate software grating can provide alignment, of the structured light pattern formed by the irradiation of a hologram on the SLM 1254, within the field of view of the detector 1274.

The software gratings may also be referred to as 'phase-ramp functions'. The period of a software grating, or the gradient of the phase ramp, determines a corresponding linear displacement of the structured light pattern on the holographic replay plane 1260, away from a midpoint.

Arrow 'C' in FIG. 12 shows the distance by which the structured light pattern 1258 can be moved, back and forth about a midpoint, on the face of the holographic replay plane/plane of interest 1260, as a result of the parallax correction provided by the available software gratings in this particular example. As will be appreciated from the preceding discussions; if, at any given time, the holographic replay plane 1260 is to be relatively distant from the plane of the SLM 1254 and the detector 1274, the parallax error will be relatively small, and therefore the movement of the structured light pattern 1258 required to correct the parallax error will be relatively small, as compared to the size of the parallax error and the movement of the structured light pattern 1258 required to correct the parallax error, in the event that the holographic replay plane 1260 is to relatively near to the plane of the SLM 1254 and the detector 1274.

Although not explicitly shown, the SLM 1254 may include a lensing function that enables the holographic reconstruction to be focused at different respective distances, away from the plane of the SLM 1254 and detector 1274. A plurality of different lensing functions, each with a different respective focal length, may be provided, stored in a suitable repository, for selection if/when needed to achieve a desired range for the SLM 1254. In other embodiments, the projection lens has sufficient depth of focus such that fine-tuning of the focus using a software lens is not necessary.

The control aspects of the system of FIG. 12 include a system controller 1200, a hologram controller 1210, and a detection controller 1220. As detailed further below; the system controller 1200 may be configured to receive inputs from, and provide outputs to, both the hologram controller 1210 and the detection controller 1220. There may also be other inputs 1230 provided to the system controller 1200, and the system controller 1200 may provide one or more other outputs 1240.

The skilled reader will appreciate that, although control aspects such as the system controller 1200, hologram controller 1210, and detection controller 1220 are shown in FIG. 12 as being physically distinct from one another, this is a schematic/functional representation only. In practice, any suitable entity such as a computer or other processor may be provided to carry out the role of the system controller 1200, and that same computer or processor may act as either the hologram controller 1210 and/or the detection controller 1220. The entity that acts as the system controller 1200 may also have other roles, for example it may provide control for other aspects of a vehicle or other system, in which the LIDAR system is comprised.

In general terms; the system controller 1200 is responsible for receiving information regarding the distance of a 'target' observation plane (which corresponds to the holographic replay plane 1260), away from the common plane on which the SLM 1254 and array detector 1274 are located, and to use that information to control, via the hologram controller 1210, the selection of an appropriate hologram and software grating, to provide parallax correction for the structured light pattern that the hologram would produce, when irradiated, on the target observation plane.

The system controller 1200 is in communication with the detection controller 1220, which in turn is in connection with the array detector 1274. The detection controller 1220 is configured to receive signals from the array detector 1274, which may indicate the distance to a plane of interest such as the target observation plane. For example, the array detector 1274 may communicate arrival times of one or more light pulses that are reflected from a target, towards the array detector 1274. The detection controller, and/or the system controller 1200 may use those arrival times—for example, in conjunction with pulse emission times from the laser diode 1252, which the system controller 1200 would have access to and may be configured to control—in order to calculate times of flight (TOF's) for those light pulses, and in turn to use those TOF's to calculate a distance or distances of the target, away from the plane of the SLM 1254 and array detector 1274.

The system controller 1200 is also in communication with the hologram controller 1210, which in turn is in connection with the laser diode 1252 and with the SLM 1254. In general terms, the system controller 1200 is configured to provide an input to the hologram controller that enables it to select, or to instruct the SLM to select, an appropriate hologram and/or an appropriate grating function, for display. The hologram controller 1210 can also convey signals to the laser diode 1252, for example to control the timing of light pulses towards the SLM 1254. Timing control signals may instead be conveyed directly from the system controller to the laser diode 1252.

Figure 13:
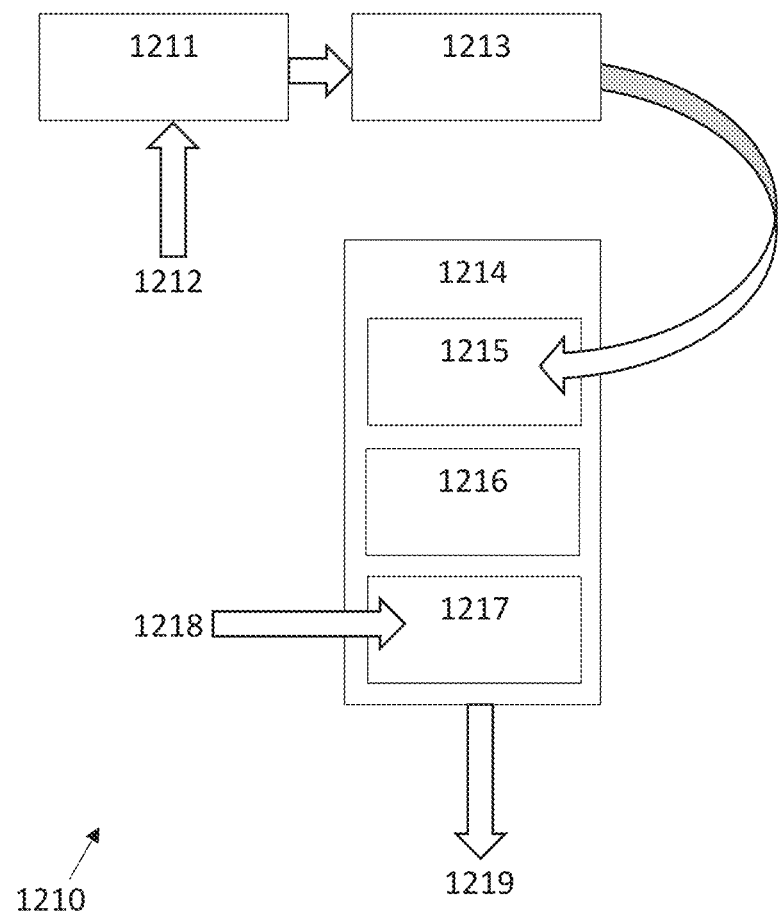
FIG. 13 is a schematic of a hologram controller for the system of FIG. 12.

The details of the hologram controller 1210 can be seen further in FIG. 13. Again, it will be appreciated that aspects of the hologram controller 1210 that are shown as being physically distinct from one another in FIG. 13 may in fact be comprised within the same physical entity, in practice.

In FIG. 13, the hologram controller 1210 is shown as receiving first 1212 and second 1218 inputs from the system controller 1200. The first input 1212 is a control signal from the system controller 1200 that determines the hologram/structured light pattern that is to be displayed, at a particular time, by the SLM 1254. The second input 1218 is a control signal from the system controller 1200 that determines the grating function that is to be used, based on depth information.

As detailed above in relation to other figures, the SLM 1254 may be configured to display different holograms, at different respective times. Each hologram, when irradiated, will give rise to a holographic reconstruction that has a distinct structured light pattern, with discrete areas of light (of a particular brightness) and with dark areas therebetween. When a holographic reconstruction is to be formed on an object (or on a plane containing an object) of interest, each hologram may give rise to a distinct illumination pattern on/within that object, and will thus illuminate particular regions or parts of that object differently to respective other regions. The control signal 1212 from the system controller 1200, which determines the hologram that is to be displayed at a given time, may therefore be derived from information previously received about the object, by the system controller 1200, and may be based on a requirement or desire to explore certain parts of the object further.

Alternatively, the control signal 1212 may indicate that a plurality of different holograms should be individually displayed at random, or that a plurality of different holograms should be individually displayed in sequence. The control signal 1212 may specify a particular selection of holograms, which are to be displayed at random or in sequence. That specification may be based on previously-stored information. For example, it may be based on previously-stored schemes or regimes for interrogating a target of a particular type, or for a particular purpose, or under particular conditions. Alternatively, or additionally, the specification of which holograms to use may be derived based on information that has been dynamically received by the system controller 1200, about the object that is of current interest. For example, if the system controller 1200 has derived, from previous frames (or probe events) that the object comprises matter, or detail, in a particular region, it may send a control signal 1212 that requires holograms which illuminate that region to be used.

The control signal 1212 is shown in FIG. 13 as being provided to a hologram engine 1211. The control signal 1212 comprises information regarding a desired structured light pattern. The hologram engine 1211 is configured to receive that information 1212 and to use it to either calculate an appropriate hologram or to retrieve an appropriate hologram from a memory. The hologram engine 1211 may comprise any suitable combination of hardware and software. It may include a memory and/or it may have access to a separate memory.

The hologram engine 1211 is in communication with a data frame generator 1213 that is configured for generating, for example, HDMI frames. The data frame generator 1213 is configured to receive a signal comprising (or concerning) the retrieved or calculated hologram, from the hologram engine 1211, and to generate and output a suitable frame.

The generated frame is fed, from the data frame generator 1213, to a display engine 1214, which may comprise for example a Field-Programmable Gate Array (FPGA). The display engine 1214 is configured to combine the generated or retrieved hologram with any other suitable aspects, such as a software lens and/or a software grating, for display by the SLM 1254. The frame is fed to a hologram extractor 1215, comprised within the display engine 1214, which can extract the hologram from the signal provided by the data frame generator 1213. There is also a software lens 1216 comprised within the display engine 1214, which may be optional, and which may comprise a plurality of lensing functions that the display engine 1214 can select from, to combine with the hologram, to ensure that the holographic reconstruction is formed at an appropriate focal length, away from the SLM 154, in order to achieve the desired range for interrogating or exploring a target or target plane of interest.

The display engine 1214 also comprises a repository of software gratings 1217, which may comprise one-dimensional and/or two-dimensional software gratings. The second control signal 1218 from the system controller 1200 to the hologram controller 1210 is shown in FIG. 13 as being communicated to the repository of software gratings 1217. Again, as mentioned above, the physical distinctions between different respective elements in the hologram controller 1210 may not actually exist, or may not exist exactly as shown, in practice. FIG. 13 is illustrative instead of the different functional aspects of the hologram controller 1210. It will thus be understood that the second control signal 1218 is input to the hologram controller 1210 in order to guide selection of an appropriate grating, for a particular frame or probe event. The second control signal 1218 therefore may comprise information regarding the distance between the plane of the SLM 1254 and detector 1274 and the plane that is to be interrogated or observed. The second control signal 1218 may comprise information regarding the distance to a particular point on the target, for example a front face, and/or it may comprise information regarding a depth (from front to back) of the target and/or it may comprise information regarding a particular depth or plane of interest, within the target. The information comprised within the second control signal 1218 may be based on information received from the detector 1274. Therefore, for example, information regarding a detection made for one or more previous frames can be used, by the system controller 1200 and/or the hologram controller 1210, to guide the selection of an appropriate software grating to be used for one or more subsequent frames. Similarly, information regarding a detection made for one or more previous frames can be used, by the system controller 1200 and/or the hologram controller 1210 to guide selection of an appropriate lensing function, should one be required to focus the holographic reconstruction correctly on the target or target plane.

The hologram controller 1210 outputs an output signal 1219 to the SLM 1254. That output signal 1219 comprises a drive signal to the SLM 1254. The SLM 1254 can use that signal to display the appropriate hologram, with a software lens if selected and with an appropriately selected software grating. As a result; when the SLM is irradiated by the laser diode 1252 (which, as mentioned above, may also be driven by the hologram controller 1210), the resultant holographic reconstruction will be formed correctly, at the range of interest, and will be aligned with the field of view of the detector 1274.

As mentioned above; the system of FIGS. 12 and 13 may operate based on a feedback loop, wherein information derived from one or more previous frames may be used to drive subsequent selections. That may comprise the calculation or retrieval of an appropriate hologram, for exploring an object of interest. It may comprise selecting one of a number of pre-defined routines or sequences of holograms, for exploring the target. It may comprise selecting an appropriate software lens, for correctly focusing the holographic reconstruction at the correction range. It may comprise selecting a grating, which will act to translate the position of the holographic reconstruction on its holographic replay plane, in order to align it correctly with the field of view of the corresponding detector 1274 and thus to compensate for a parallax error that would otherwise have arisen, in the absence of the grating.

The system can be used to compensate for parallax error dynamically. It can vary the magnitude of the compensation, dependent on the desired or intended range for a particular frame. Therefore, it can be used to ensure the holographic reconstruction is correctly aligned with the detector for every frame, even when the system is employing a scheme in which different depths are being explored, at high frame rates. The system may be self-teaching and/or self-correcting, wherein the detector can provide feedback to the system controller. That feedback may indicate that a previous parallax correction was imperfect, in which case the system may be configured to learn from that information and to attempt an improved parallax correction for one or more subsequent frames. The system may be configured to store (or to convey to a memory, for storage) a correlation or relationship between the required range (i.e. distance between the plane of the SLM 1254 and detector 1274 and the plane of interest) and the required size of parallax correction, for a particular spatial separation between the SLM 1254 and the detector 1274, on their common plane, and/or under particular conditions.

The improvements detailed herein can lead to highly accurate results from a Light Detecting and Ranging (LIDAR) system, and from other systems that comprises a holographic projector and detector as described herein. Moreover, the improvements detailed herein can do so in a compact, efficient, and cost-effective manner. They are therefore suitable for implementation in a variety of real-world applications, including those for which size, computational efficiency and/or expense are important.

The improvements detailed herein do not require any physical calibration or physical adjustment of the optics within the system. Moreover, they can be implemented successfully, irrespective of the distance of a target, away from the system. There is no loss of either hologram resolution or sensor resolution, as a result of these improvements.

Laser Power Cap

The skilled reader will appreciate that a system such as the LIDAR system of FIG. 12, comprising a laser or laser diode, will have associated safety requirements. In particular, a laser-based system, such as a LIDAR system, must operate within so-called 'eye-safe' limits. This is to ensure that an observer or user of the system does not suffer damage to their eyes, from the intensity of the laser beam.

The skilled person will also be aware that the eye-safe limit for laser applications is a function of the laser power, divergence angle and distance to the eye. In previous LIDAR systems, it has been conventional to assume a short distance, between the nearest object and the laser, for the calculation of the maximum permissible laser power, for a given divergence angle, in order to ensure safety. This approach assumes, for safety reasons, that the target is an eye. The present inventor has however recognised that, in the case of a LIDAR system, there is no need to assume a short distance, at all times, because the distance between the target and the light source and detector is (or can be) known. Moreover, the distance between any other objects within (or potentially within) the path of the laser can be known. Therefore, the present inventor has recognised that the information obtained from the detector (such as the detector 1274 in FIG. 12) regarding the distance to the plane of interest or target (or regarding the distance to another object, such as an object nearest the SLM 1254) can be fed back to the system controller, and can be used to calculate a maximum safe laser power limit, for that distance and for a particular divergence angle (or range of angles). Again, this approach assumes, for safety reasons, that the target or other object is an eye.

Referring again to the system of FIGS. 12 and 13; the system controller 1200 can be configured so that, for an initial scan (or frame), which may be used to perform an initial object detection, the selected laser intensity is sufficiently low such that no damage would be caused to an observer, regardless of the distance between the SLM 1254 and the observer, should he or she be present. Once the detector 1274 has detected light reflected from one or more objects, as a result of the initial scan, the TOF or other information comprised within that reflected light can be used to calculate a distance of the object(s), away from the plane of the SLM 1254 and detector 1274. The system can be configured to then use the calculated object distance to control a selection of an appropriate laser power, which is within eye-safe limits for that object distance.

As with the software grating selections described above; the laser power selection can be dynamic and may be adjusted based on different respective distances of two or more different objects, or of dynamically changing distances to one or more objects, within an observed scene, to the plane of the SLM 1254 and detector 1274, and/or it may be adjusted based on a desired or required depth at which a scene or object is to be probed. The system may use feedback from the detector 1274 in order to tune its laser selection more accurately.

The inventor's recognitions as regards laser power enable a LIDAR system (or other system comprising a light source and detector as described herein) to be less constrained than has previously been the case. The skilled reader will appreciate that, typically, laser power can limit the range of a LiDAR system, and can make it less effective (or unemployable) for observing targets that are relatively far from the light source and detector. By contrast; by implementing the recognitions described herein, a LIDAR system can be controlled to scale the laser the power, based on actual distance to the object or scene of interest, whilst remaining safe. Therefore, the range and the usefulness of the system are improved. Moreover, the implementation may be implemented using appropriate software and should not require the addition or change of any higher-cost (or larger size) aspects of a LIDAR system.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, an intermediate holographic reconstruction is formed on a light receiving surface such as a diffuser surface or screen such as a diffuser. In some embodiments, there is provided a vehicle comprising the LIDAR system. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, only the primary replay field is utilised and system comprises physical blocks, such as baffles, arranged to restrict the propagation of the higher order replay fields through the system.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A light detection and ranging, "LiDAR", system arranged to make time of flight measurements of a scene, the LiDAR system comprising:
   a holographic projector comprising: a spatial light modulator arranged to display light modulation patterns, each light modulation pattern comprising a hologram and grating function having a periodicity; a light source arranged to illuminate each displayed light modulation pattern in turn; and a projection lens arranged to receive spatially modulated light from the spatial light modulator and project a structured light pattern corresponding to each hologram onto a respective replay plane, wherein the position of the structured light pattern on the replay plane is determined by the periodicity of the corresponding grating function;
   wherein there is a spatial separation between the spatial light modulator and the array of detection elements, such that they have two different respective lines of sight of a target, within the scene;
   a detector comprising an array of detection elements and an imaging lens arranged such that each detection element receives light from a respective sub-area of the holographic replay plane, wherein the sub-areas collectively define a field of view of the detector on the replay plane; and
   a system controller arranged to receive distance information related to the scene and output to the holographic projector a control signal corresponding to the distance information, wherein the holographic projector is arranged to use the control signal to determine a parameter for projection of a subsequent structured light pattern;
   wherein the parameter is indicative of a subsequent grating function that should be selected, for combination with a hologram, to ensure that the resulting structured light pattern, corresponding to that subsequent grating function, will be located within the detector's field of view on the replay plane.

2. The system of claim 1, wherein the distance information comprises the distance to an object or plane of interest.

3. The system of claim 1, wherein the structured light pattern comprises a plurality of discrete light features, wherein each discrete light feature is formed within a respective sub-area of the sub-areas that collectively define the field of view of the detector.

4. The system of claim 3, wherein each detection element comprised within the detector is aligned with one light feature within the structured light pattern.

5. The system of claim 3 wherein the system is arranged to make a time of flight measurement in relation to each discrete light feature of a structured light pattern based on a detection signal from the corresponding detection element in order to form a plurality of time of flight measurements in relation to the structured light pattern.

6. The system of claim 1 wherein the light modulation pattern further comprises a lensing function having a focal length, wherein the distance from the spatial light modulator to the replay plane is determined by the focal length.

7. The system of claim 6 wherein the holographic projector is further arranged to determine the focal length of the lensing function based on the control signal.

8. The system of claim 1 wherein the distance information defines the location of the replay plane in the scene for a subsequent structured light pattern.

9. The system of claim 1 wherein the spatial light modulator and the array of detection elements are substantially parallel.

10. The system of claim 9 wherein holographic projector is arranged to determine the periodicity of the subsequent grating function of the sequence of light modulation patterns.

11. The system of claim 1 wherein the distance information defines a plane in the scene.

12. A method of determining a parameter for projection of a structured light pattern by a holographic projector;
    said holographic projector being comprised within a light detection and ranging, "LiDAR", system arranged to make time of flight measurements of a scene, the LiDAR system further comprising a detector and a controller;
    said holographic projector comprising a spatial light modulator arranged to display a light modulation pattern comprising a hologram and grating function having a periodicity, and a light source arranged to illuminate the displayed light modulation pattern and project a structured light pattern corresponding to the hologram on a replay plane;
    wherein the detector has a field of view defined on the replay plane; and
    wherein there is a spatial separation between the spatial light modulator and the array of detection elements, such that they have two different respective lines of sight of a target, within the scene; the method comprising:
    projecting light from the light source, via the spatial light modulator, towards the scene;
    detecting, by the detector, a reflection of the light from the scene;
    making a determination of distance information related to the scene, based on the detection made by the detector;
    selecting a parameter for a subsequent projection of a structured light pattern, by the holographic projector, based on the determined distance information wherein the step of selecting a parameter for subsequent projection of a structured light pattern comprises determining the periodicity of a subsequent grating function such that the resulting structured light pattern, corresponding to that subsequent grating function, will be located within the field of view of the detector.

13. The method of claim 12 wherein the step of selecting a parameter for subsequent projection of a structured light pattern comprises determining a distance by which the structured light pattern should be moved, away from a reference point, on the holographic replay plane and determining the periodicity of the grating function that would effect that movement.

14. The method of claim 12 wherein the distance information defines a plane in the scene.

15. A method of controlling a light detection and ranging, "LiDAR", system arranged to make time of flight measurements of a scene, the LiDAR system comprising a holographic projector and a detector;
said holographic projector comprising a spatial light modulator arranged to display a light modulation pattern comprising a hologram and grating function having a periodicity, and a light source arranged to illuminate the displayed light modulation pattern and project a structured light pattern corresponding to the hologram on a replay plane;
wherein the detector has a field of view defined on the replay plane; the method comprising:
providing a control instruction to the holographic projector to project light from the light source, via the spatial light modulator, towards the scene;
receiving a detection signal, from the detector, indicating a reflection of the light from the scene;
making a determination of distance information related to the scene, based on the detection signal received from the detector;
selecting a parameter for a subsequent operation of the holographic projector, based on the determined distance information; and
providing a control instruction to the holographic projector to perform said subsequent operation.

16. The method of claim 15 wherein the distance information indicates the proximity of a nearest object in the scene.

17. The method of claim 15 wherein the step of selecting a parameter for subsequent projection of a structured light pattern comprises selecting an intensity of the light of the light source.

18. The method of claim 12, wherein said method is a computer-implemented method.

19. A non-transitory data storage storing computer program instructions which, when executed by data a processing apparatus, causes the data processing apparatus to perform a method according to claim 12.

20. A non-transitory computer readable medium having stored thereon computer program instructions according to claim 19.

21. The system of claim 4, wherein there is a one-to-one correlation between the detection elements and the discrete light features.

22. The system of claim 9, wherein the spatial light modulator and the array of detection elements are substantially co-planar.

* * * * *